(12) United States Patent
Fullerton

(10) Patent No.: US 9,268,048 B2
(45) Date of Patent: Feb. 23, 2016

(54) SYSTEM AND METHOD FOR HARNESSING PRESSURE PRODUCED BY A DETONATION

(71) Applicant: Soundblast Technologies, LLC, Winter Park, FL (US)

(72) Inventor: Larry W. Fullerton, New Hope, AL (US)

(73) Assignee: SOUNDBLAST TECHNOLOGIES, LLC, Winter Park, FL (US)

(*) Notice: Subject to any disclaimer, the term of this patent is extended or adjusted under 35 U.S.C. 154(b) by 0 days.

(21) Appl. No.: 14/699,742

(22) Filed: Apr. 29, 2015

(65) Prior Publication Data

US 2015/0234061 A1    Aug. 20, 2015

Related U.S. Application Data

(63) Continuation of application No. 14/176,068, filed on Feb. 8, 2014, which is a continuation-in-part of application No. 13/669,985, filed on Nov. 6, 2012, now Pat. No. 8,905,186, which is a continuation-in-part of application No. 13/049,386, filed on Mar. 16, 2011, now Pat. No. 8,302,730, which is a continuation of application No. 11/785,327, filed on Apr. 17, 2007, now Pat. No. 8,292,022.

(60) Provisional application No. 61/987,337, filed on May 1, 2014, provisional application No. 60/850,685, filed on Oct. 10, 2006, provisional application No. 60/792,420, filed on Apr. 17, 2006.

(51) Int. Cl.
*G01V 1/04* (2006.01)
*G01V 1/104* (2006.01)

(52) U.S. Cl.
CPC .................................... *G01V 1/104* (2013.01)

(58) Field of Classification Search
CPC ........................................................ G01V 1/13
USPC ........................................................ 181/116
See application file for complete search history.

(56) References Cited

U.S. PATENT DOCUMENTS

| | | | | |
|---|---|---|---|---|
| 3,275,098 A * | 9/1966 | William | ........................ | 181/116 |
| 3,511,333 A * | 5/1970 | Grau Gerard et al. | ........ | 181/116 |
| 4,059,820 A * | 11/1977 | Turpening | ...................... | 367/140 |
| 4,867,266 A * | 9/1989 | Martin | .......................... | 181/106 |
| 5,864,517 A * | 1/1999 | Hinkey et al. | ................. | 367/145 |
| 5,873,240 A * | 2/1999 | Bussing et al. | .................. | 60/207 |
| 6,408,614 B1 * | 6/2002 | Eizenhofer | .................. | 60/200.1 |
| 6,813,878 B2 * | 11/2004 | Kraft | ............................... | 60/247 |
| 7,882,926 B2 * | 2/2011 | Fullerton | ....................... | 181/117 |
| 8,905,186 B2 * | 12/2014 | Fullerton et al. | .............. | 181/101 |

* cited by examiner

*Primary Examiner* — Forrest M Phillips
(74) *Attorney, Agent, or Firm* — Vector IP Law Group; Robert S. Babayi

(57) ABSTRACT

A detonation wave pressure harnessing system includes a detonator tube that generates a detonation wave. The detonation wave produces a pressure in a coupling chamber that is substantially sealed when the detonation wave is generated. An interface between the coupling chamber and a target converts the pressure into a force that is applied to the target. The system includes an inflow valve assembly and an outflow valve assembly and a control system that controls the outflow valve assembly.

20 Claims, 25 Drawing Sheets

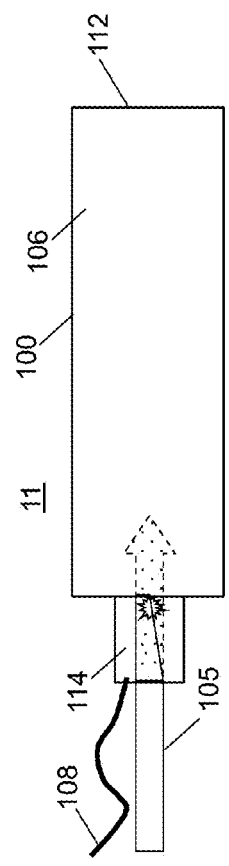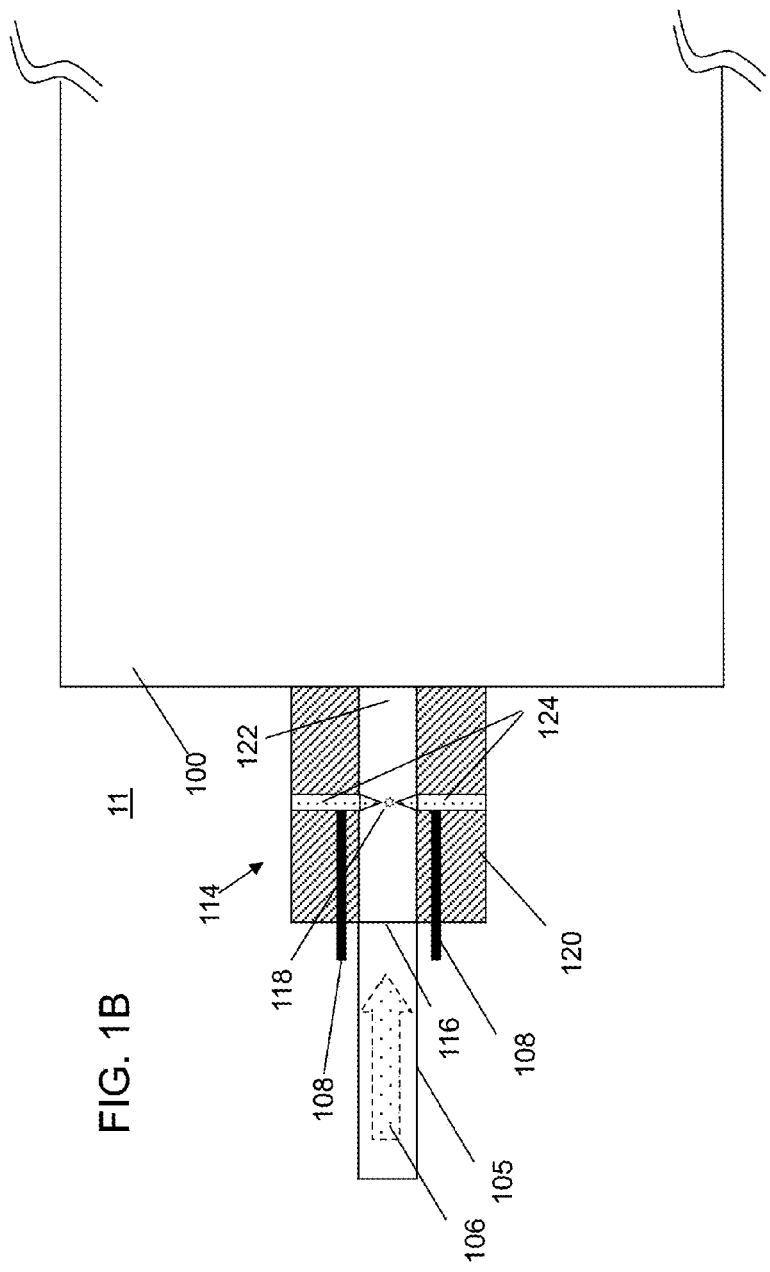

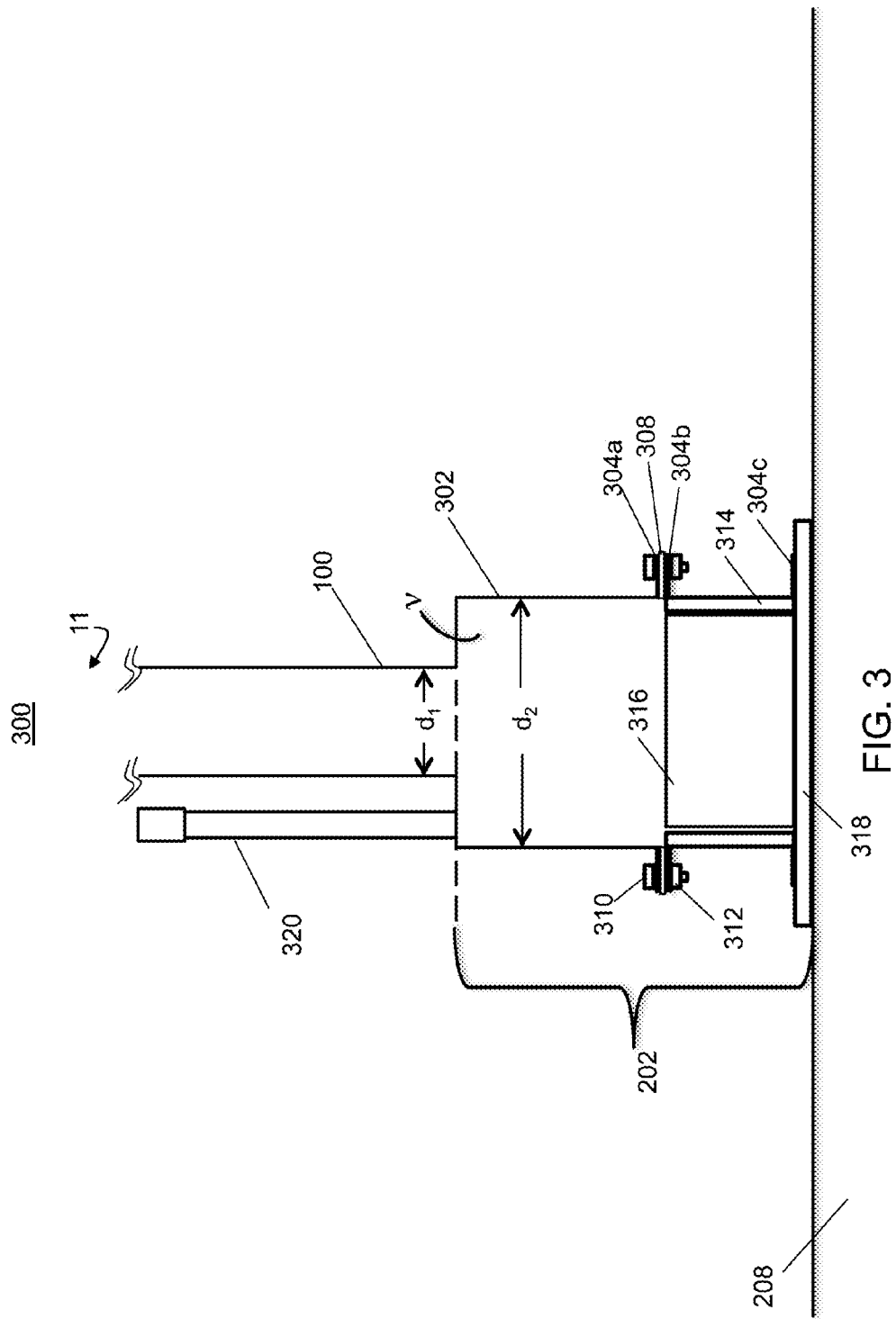

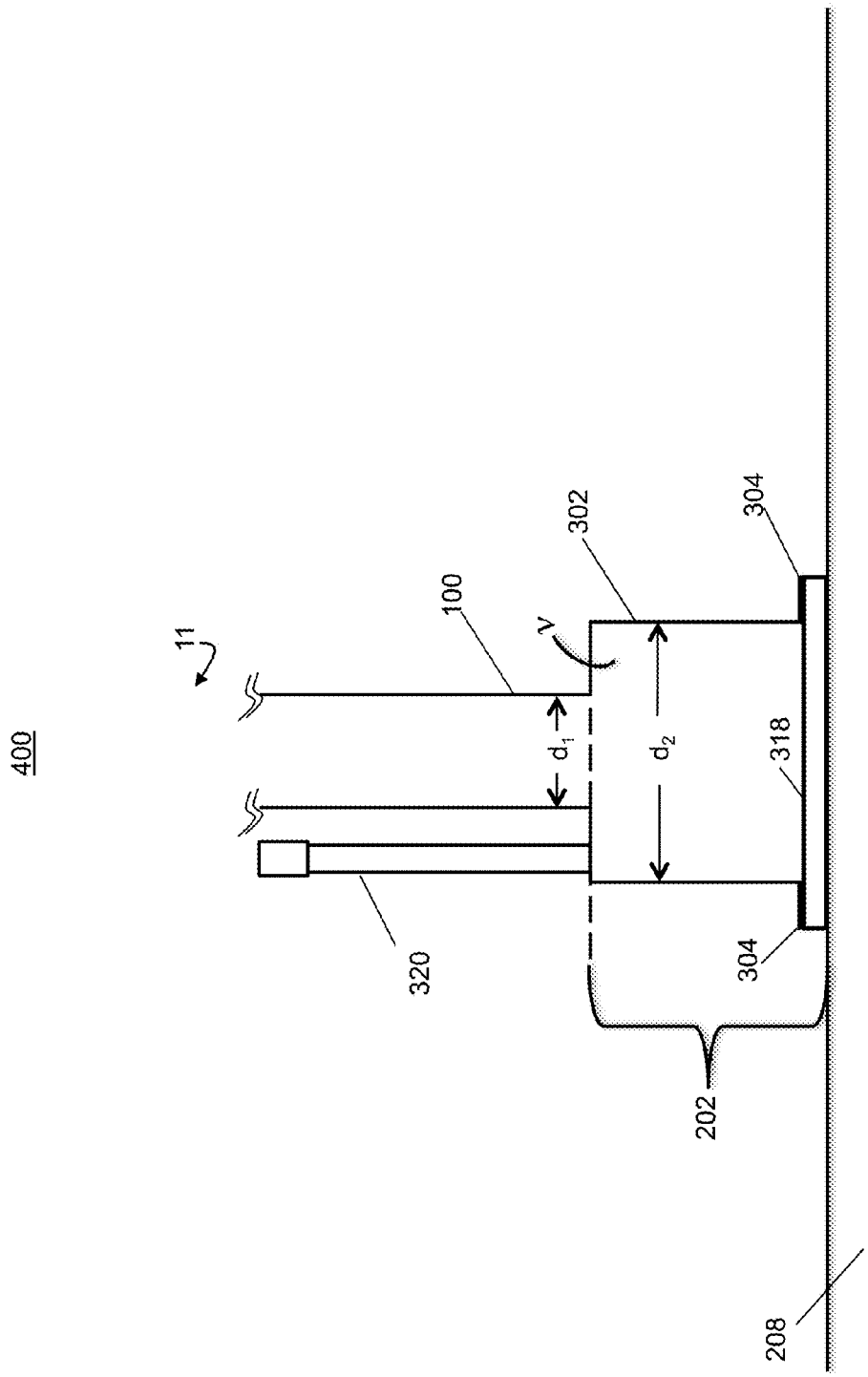

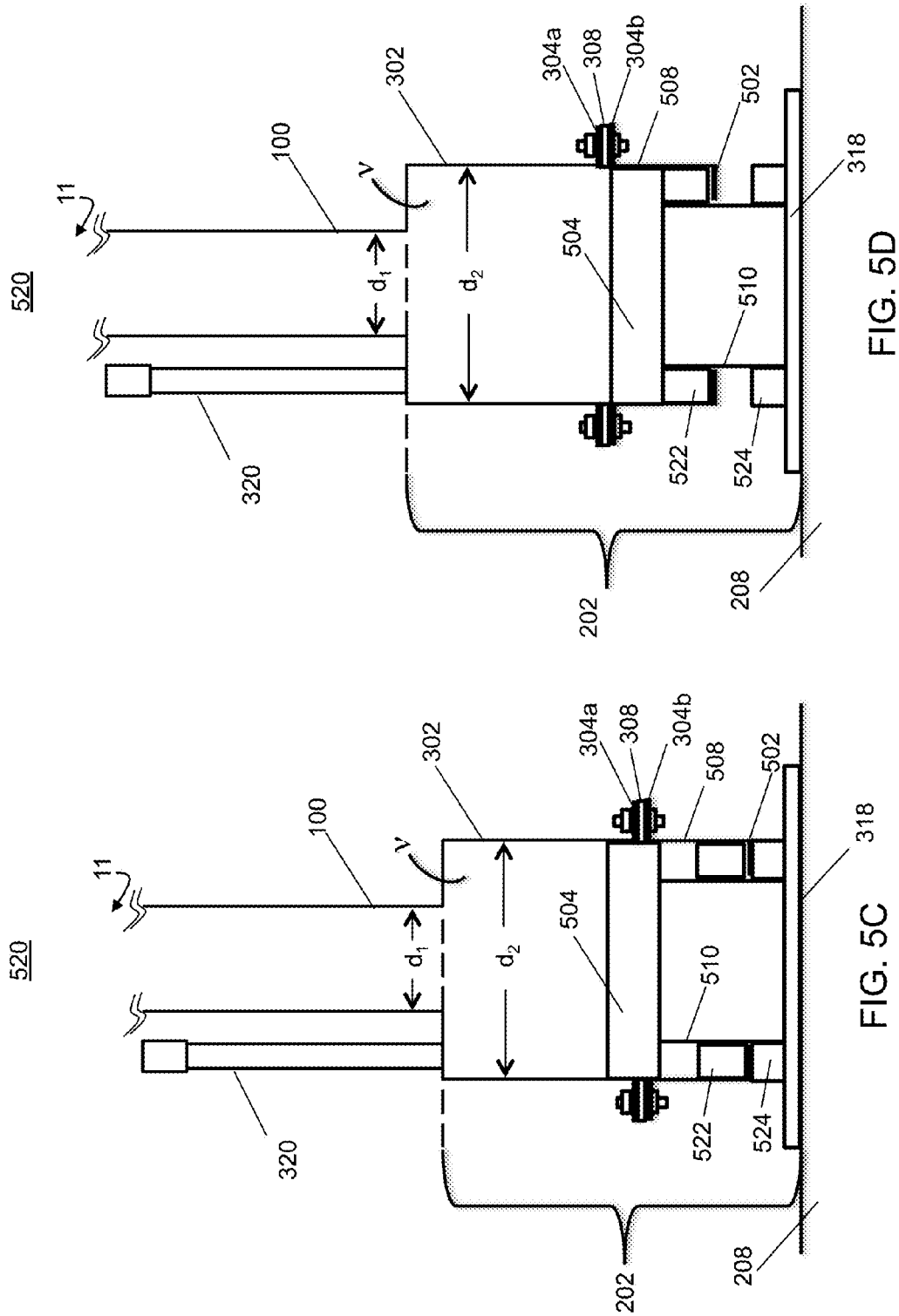

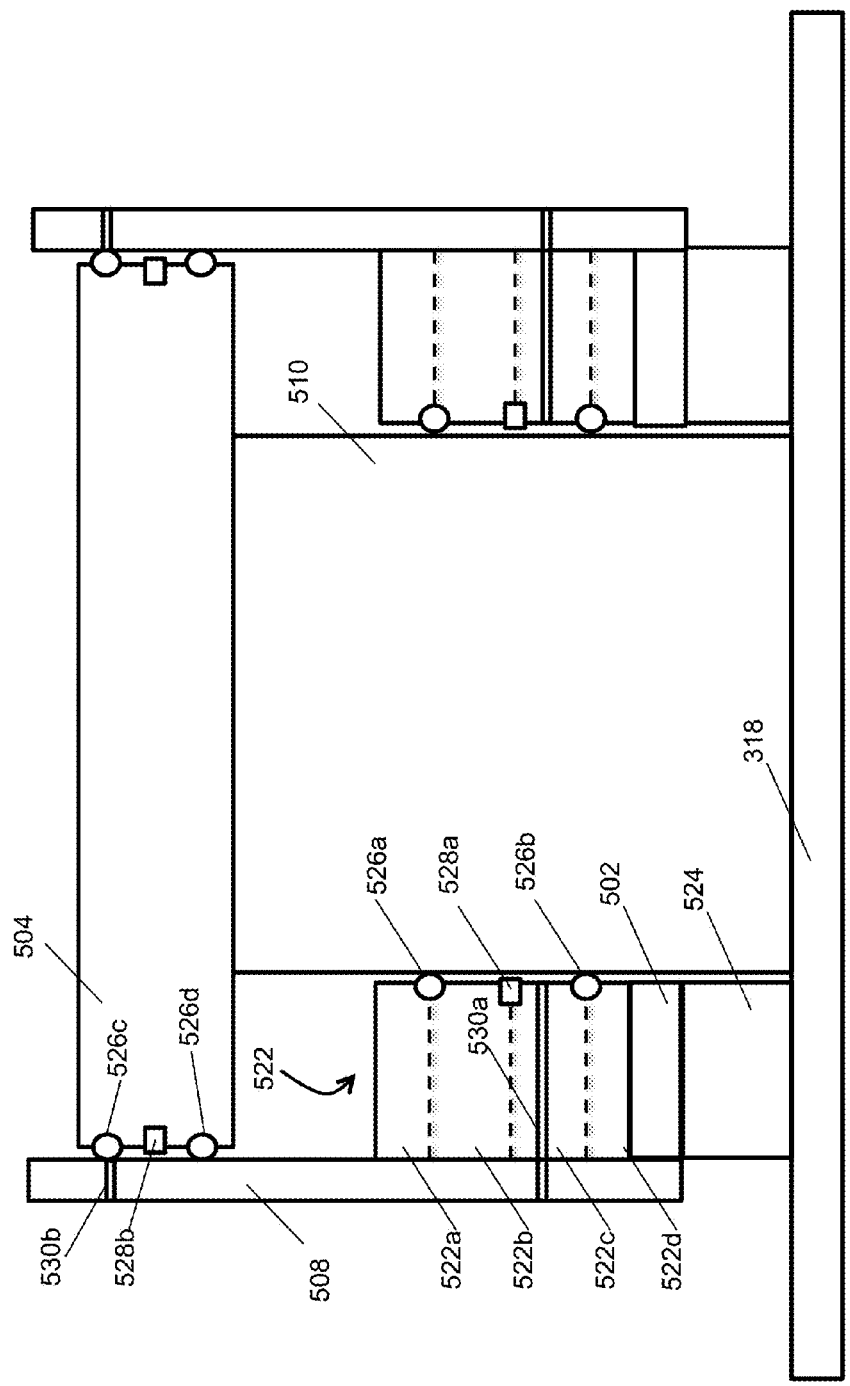

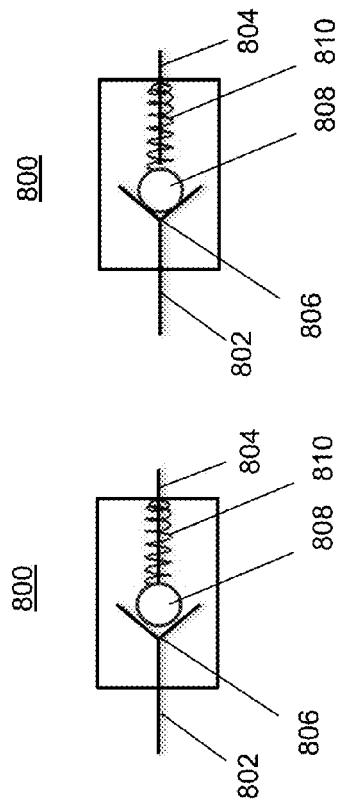
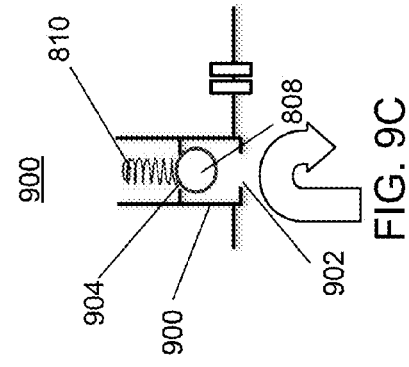
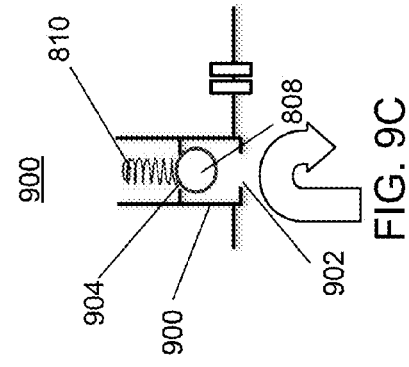
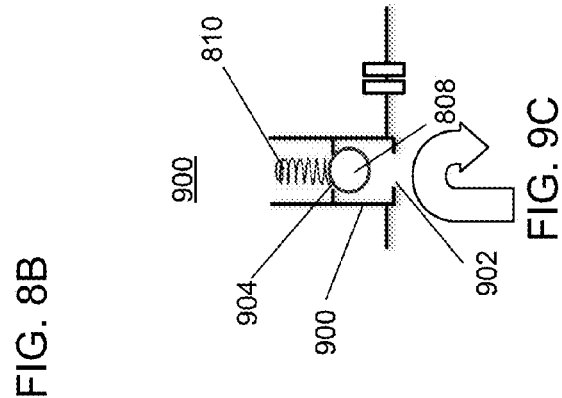

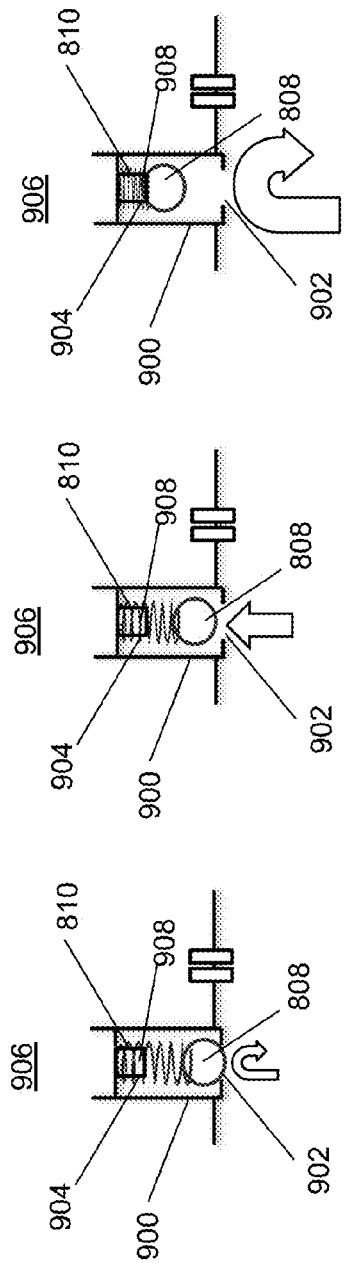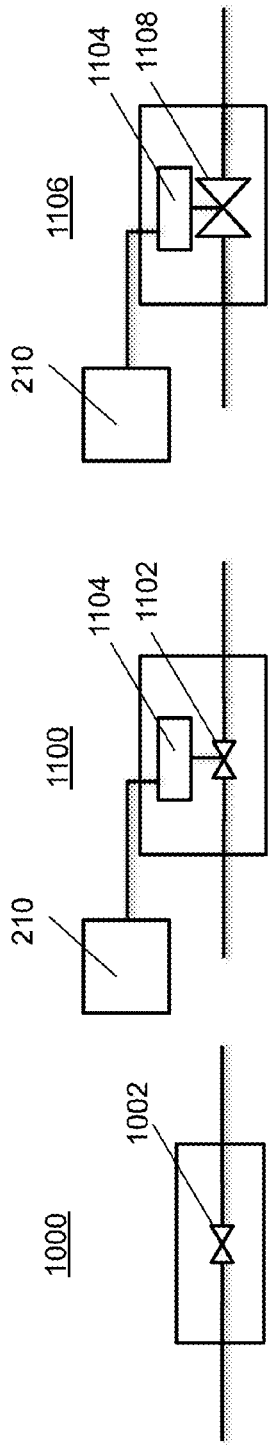

SYSTEM AND METHOD FOR HARNESSING PRESSURE PRODUCED BY A DETONATION

CROSS REFERENCE TO RELATED PATENTS AND PATENT APPLICATIONS

This U.S. Non-Provisional Patent Application is a Continuation-in-Part of U.S. Non-Provisional patent application Ser. No. 14/176,068, filed Feb. 8, 2014, titled "System and Method for Coupling an Overpressure Wave to a Target Media", which is a Continuation-in-Part of U.S. Pat. No. 8,905,186, issued Dec. 9, 2014, which is a Continuation-in-Part of U.S. Pat. No. 8,302,730, issued Nov. 11, 2012, which is a Continuation-in-Part of U.S. Pat. No. 8,292,022, issued Oct. 23, 2012, which claims priority to U.S. Provisional Patent Application 60/792,420, filed Apr. 17, 2006, and U.S. Provisional Patent Application 60/850,685, filed Oct. 10, 2006. This application also claims priority to U.S. Provisional Patent Application 61/987,337, filed May 1, 2014, titled "System and Method for Harnessing Pressure Produced by a Detonation". These related patents and patent applications are all incorporated herein by reference in their entirety.

FIELD OF THE INVENTION

The present invention relates generally to a system and method for harnessing pressure produced by a detonation. More particularly, the present invention relates to a system and method for harnessing pressure produced by a detonation within an overpressure wave generator configured to couple an overpressure wave to a target media.

SUMMARY OF THE INVENTION

A detonation wave pressure harnessing system includes a detonator tube that generates a detonation wave, a coupling chamber that is substantially sealed when the detonation wave is generated thereby containing a pressure produced by the detonation wave, an interface between the coupling chamber and a target that converts the pressure into a force that is applied to the target, an inflow valve assembly, an outflow valve assembly, and a control system that controls the outflow valve assembly.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 1A and 1B depict an exemplary overpressure wave generator;

FIG. 3 depicts an exemplary coupling component that includes a coupling chamber a cylinder, a piston, and an earth plate;

FIG. 4 depicts an exemplary coupling component that includes a coupling chamber and a push plate;

FIG. 5C depicts the exemplary coupling component of FIG. 5B prior to detonation;

FIG. 5D depicts the exemplary coupling component of FIG. 5B immediately after detonation;

FIG. 5E depicts an exemplary stabilizing component;

FIG. 8A depicts an exemplary check valve in an open state;

FIG. 8B depicts the exemplary check valve of FIG. 8A in a closed state;

FIG. 9A depicts a first exemplary excess flow valve in a first closed state;

FIG. 9B depicts the exemplary excess flow valve of FIG. 9A in an open state;

FIG. 9C depicts the exemplary excess flow valve of FIG. 9A in a second closed state;

FIG. 9D depicts a second exemplary excess flow valve in a first closed state;

FIG. 9E depicts the exemplary excess flow valve of FIG. 9D in an open state;

FIG. 9F depicts the exemplary excess flow valve of FIG. 9D in a second closed state;

FIG. 10 depicts a constant slow flow rate valve having a leak flow rate;

FIG. 11A depicts a solenoid valve having a leak flow rate;

FIG. 11B depicts a solenoid valve having a rapid discharge flow rate;

DETAILED DESCRIPTION OF THE INVENTION

Figure 2:
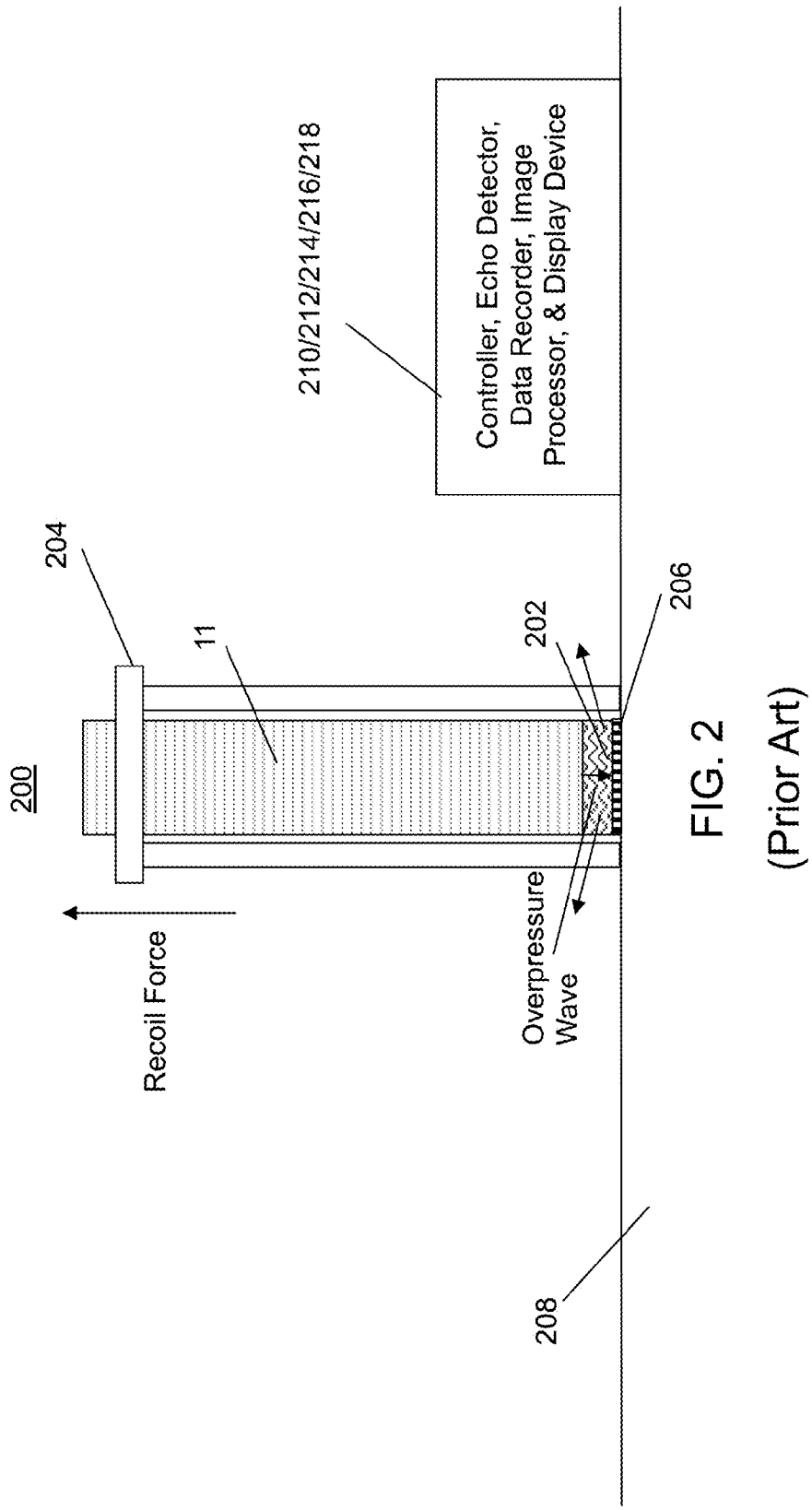
FIG. 2 depicts an exemplary seismic exploration system.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses comprising overpressure wave generators, methods for using overpressure wave generators, and so forth. Example realizations for such embodiments may be facilitated, at least in part, by the use of an emerging, revolutionary overpressure wave generation technology that may be termed direct detonation overpressure wave generation that enables precision timing and amplitude control of detonations and corresponding generated overpressure waves. Alternatively, the technology may be termed instantaneous detonation or any other such terminology indicative that detonation is achieved without deflagration, or in other words, without a deflagration to detonation transition (DDT) process. Direct detonation technology was first fully described and enabled in the co-assigned U.S. Pat. No. 7,883,926 issued on Feb. 8, 2011 and entitled "System and Method for Generating and Directing Very Loud Sounds", the co-assigned U.S. Pat. No. 7,886,866 issued on Feb. 15, 2011 and entitled "System and Method for Ignition of a Gaseous or Dispersed Fuel-oxidant Mixture", and the co-assigned U.S. Pat. No. 8,292,022, issued on Oct. 23, 2012 and entitled "System and Method for Generating and Controlling Conducted Acoustic Wave for Geophysical Exploration". The contents of these documents are hereby incorporated herein by reference. A second generation of a direct detonation overpressure wave technology is described and enabled in the co-assigned U.S. Pat. No. 8,302,730, issued on Nov. 6, 2012, and entitled "System and Method for Generating and Controlling Conducted Acoustic Wave for Geophysical Exploration". The contents of this document are hereby incorporated herein by reference.

The present invention pertains to a system and method for harnessing pressure produced by a detonation of an overpressure wave generator configured to couple an overpressure wave to a target media to produce an acoustic wave in the target media for seismic exploration. In a first embodiment, a detonation tube is filled with a fuel mixture while under pressure and an outflow assembly is in a slow venting state and then the fuel mixture is detonated while the fuel is flowing into the detonation tube. Upon detonation, an inflow valve assembly is closed, the release of pressure in the detonation tube is controlled and, once released, a back pressure is released. In a second embodiment, a detonation tube is filled with a fuel mixture while under pressure and an outflow assembly is in a slow venting state and then the fuel mixture is detonated while the fuel is flowing into the detonation tube. Upon detonation, an inflow valve assembly and an outflow valve assembly are closed, the release of pressure in the detonation tube is controlled and, once released, a back pressure is released. In a third embodiment, a detonation tube is filled with a fuel mixture while under pressure and an outflow assembly is in a closed state and then the fuel mixture is detonated while the fuel is flowing into the detonation tube. Upon detonation, an inflow valve assembly is closed, the release of pressure in the detonation tube is controlled and, once released, a back pressure is released.

Direct Detonation Overpressure Wave Generator Background

FIGS. 1A and 1B depict an exemplary direct detonation overpressure wave generator. FIG. 1A depicts a detonation tube 100 of an overpressure wave generator 11 being supplied by fuel-oxidant mixture supply 105 via a detonator 114, where a spark ignites within the fuel-oxidant mixture 106 while the detonation tube 100 is being filed with the fuel-oxidant mixture 106 instantly causing detonation at the point of ignition that causes a detonation wave to propagate down the length of the detonation tube 100 and exit its open end 112.

As shown in 1B, the detonator 114 comprises an electrically insulating cylinder 120 surrounding a detonator tube 122. Electrodes 124 are inserted from the sides of insulating cylinder 120 and are connected to high voltage wire 108. The detonator tube 122 is connected to fuel-oxidant mixture supply 105 (shown in FIG. 3B) at a fill point 116 and to a detonation tube 100 at its opposite end. As shown in FIG. 1B, a gas mixture 106 is passed into the detonator tube 122 and then into the detonation tube 100 via a fill point 116 of the detonator 114. When the detonation tube 100 is essentially full, high voltage wire 108 is triggered to cause a spark 118 to occur across electrodes 124 and to pass through the gas mixture 106 flowing into detonator tube 122 to initiate detonation of the gas in the detonation tube 100.

FIG. 2 depicts an exemplary seismic exploration system 200 that includes an overpressure wave generator 11, a coupling component 202, a stabilizing mechanism 204 for controlling the movement of the overpressure wave generator, a controller 210 for controlling the operation of the overpressure wave generator 11, an echo detector 212, a data recorder 214, an image processor 216, and a display device 218. The open end of the overpressure wave generator 11 is configured such that generated overpressure waves are directed towards a target media 208. It should be understood that while the foregoing elements of the system 200 are identified separately, these elements do not necessarily have to be physically separated and can be configured in various alternative ways.

The exemplary overpressure wave generator 11 of system 200 includes a source for producing a spark, a detonation tube, a gas mixture source that provides the flowing gas into the detonation tube, and a detonator. The overpressure wave generator can alternatively comprise a group of detonation tubes that are detonated simultaneously so as to produce a combined overpressure wave. The system 200 can be implemented using one or more nozzles so as to more closely match the impedance of the detonation wave generated by the overpressure wave generator to the impedance of the ambient environment, e.g., the air, thereby reducing the reflection of energy back into the overpressure wave generator, increasing the strength of the overpressure wave that is generated, increasing the resulting force produced by the overpressure wave, and resulting in stronger conducted acoustic waves.

The overpressure wave generator is detonated to generate an overpressure wave. The force of the generated overpressure is coupled by coupling component 202 to a target media 208 such as the ground, ice, or water to produce a conducted acoustic wave. Stabilizing mechanism 204 provides stability to the movement of the overpressure wave generator 11 essentially allowing only up and down movement or substantially preventing movement altogether.

Coupling component 202 may comprise air, a liquid, a spring or may comprise rubber or some comparable compound having desired spring-like and damping characteristics, such as opposing polarity magnets. Coupling component 202 may optionally comprise an impedance transition device 206 as described previously, which directly contacts the target media 208 to impart the conducted acoustic wave. Impedance transition device 206 can have any of various types of shapes. In an exemplary embodiment, the impedance transition device 206 has a flat round shape. Under one arrangement, the impedance transition device 206 of the coupling component 202 corresponds to one or more surfaces of the coupling component 202 and, therefore, is not a separate device.

Whereas the coupling component of FIG. 2 has spring-like and damping characteristics and may include an impedance transition device, the coupling component of the present invention does not and instead comprises a coupling chamber and a push plate assembly that is in contact with a target media. The coupling chamber is substantially sealed at the moment of detonation and the pressure produced in the coupling chamber by a generated overpressure wave is applied to push plate assembly directly or via a piston thereby converting the pressure into a force thereby producing a conducted acoustic wave into the target media.

FIG. 3 depicts a cross-section of an exemplary overpressure wave generator. A detonation tube 100 of an overpressure wave generator 11 is attached to a coupling component 202. The detonation tube 100 is oriented to direct a generated overpressure wave towards a target media 208. The coupling component 202 includes a coupling chamber 302, a cylinder 314, a piston 316, and an push plate assembly comprising an earth plate 318, which can be made of a rigid low mass substance such as titanium, aluminum, or composite materials such as carbon composite or fiber glass or high mass substances such as iron or steel.

The detonation tube 100 can have a first diameter $d_1$ and the coupling chamber 302 can have a second diameter $d_2$, where the diameter $d_2$ can be less than or greater than the first diameter $d_1$. Alternatively, the coupling chamber could have the same diameter as the detonation tube. The coupling chamber can also have a varying diameter and can have a shape other than a round shape, for example, an oval shape, or rectangular shape, or any other desired shape. The coupling chamber has a volume, v, in which a peak pressure is produced when the overpressure wave is generated, where the volume for a round coupling chamber is a function of its height and diameter. Overall, the diameters d1 and d2 and volume v can be selected to have a desired pressure ratio between the pressure in the detonation tube 100 and the pressure in the coupling chamber 302. For example, the pressure in the detonation tube might be on the order of 500 psi while the pressure in the coupling chamber might be on the order of 130 psi.

The coupling chamber 302 may include an outer flange 304a. The cylinder 314 may include a top outer flange 304b and may include a lower outer flange 304c. A rubber or comparable sealing component 308 can be placed between the outer flange 304a of the coupling chamber 302 and the upper outer flange 304b of the cylinder 314. Bolts 310 can be placed in holes in the two flanges 304a 304b and secured with nuts 312 in order to attach the cylinder 314 to the coupling chamber 302. Alternatively, the coupling chamber 302 and cylinder 314 can be welded together or otherwise be a single component. The area of the top of the piston 316 and the pressure applied to it determine the force converted into a conducted acoustic wave in the target media. The area of the plate 318 that is contact with the target media determines the distribution of the force being applied to the target media. Also shown in FIG. 3 is a vent pipe 320 which could have a nozzle, a muffler, and/or a restrictor.

FIG. 4 depicts a cross-section of an exemplary system 400 comprising a overpressure wave generator 11 attached to a coupling component 202 that includes a coupling chamber 302 and a push plate assembly comprising an earth plate 318. The coupling chamber has an outer flange 304 that rests on the plate 318. Such an arrangement requires operation on very hard surfaces like desert earth, roadways, dams, etc.

Figure 5A:
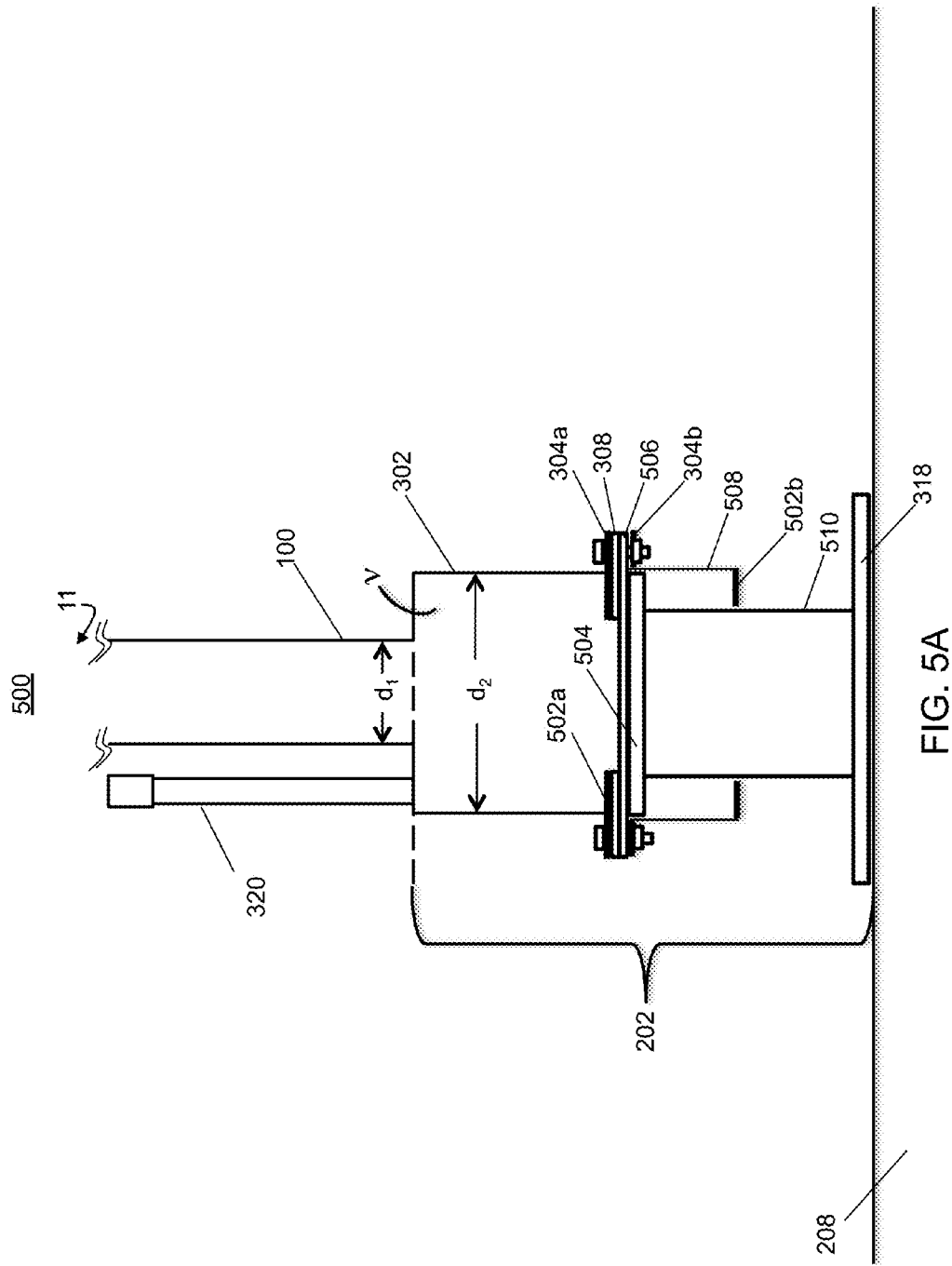
FIG. 5A depicts an exemplary coupling component that includes a coupling chamber, a flexible membrane, and a push plate assembly comprising a top plate, a piston rod, a movement constraining vessel, and an earth plate.

FIG. 5A depicts a cross-section of an exemplary system 500 comprising an overpressure wave generator 11 attached to a coupling component 202 that includes a coupling chamber 302, a flexible membrane 506, and a push plate assembly comprising a top plate 504, a piston rod 510, and an earth plate 318 that is in contact with the target media. The movement of the top plate 504 and piston rod 318 are constrained in movement constraining vessel 508. The coupling chamber 302 includes an inner flange 502a that prevents the top plate 504 from moving upward. A rubber or comparable sealing component 308 is placed between the inner flange 502a (and optionally outer flange 304a) and the flexible membrane 506. The movement constraining vessel has an upper outer flange 304b and an inner flange 502b where the top plate 504 can move between the flexible membrane 506 and the inner flange 502b. The top plate 504 and earth plate 318 may be rigid disks having low mass and strength such as titanium, aluminum, or composite materials such as carbon composite or fiber glass or high mass substances such as iron or steel. The piston rod 510 and movement constraining vessel may each be pipes that are also rigid and low mass and may be titanium, aluminum, or composite materials such as carbon composite or fiber glass or high mass substances such as iron or steel.

Figure 5B:
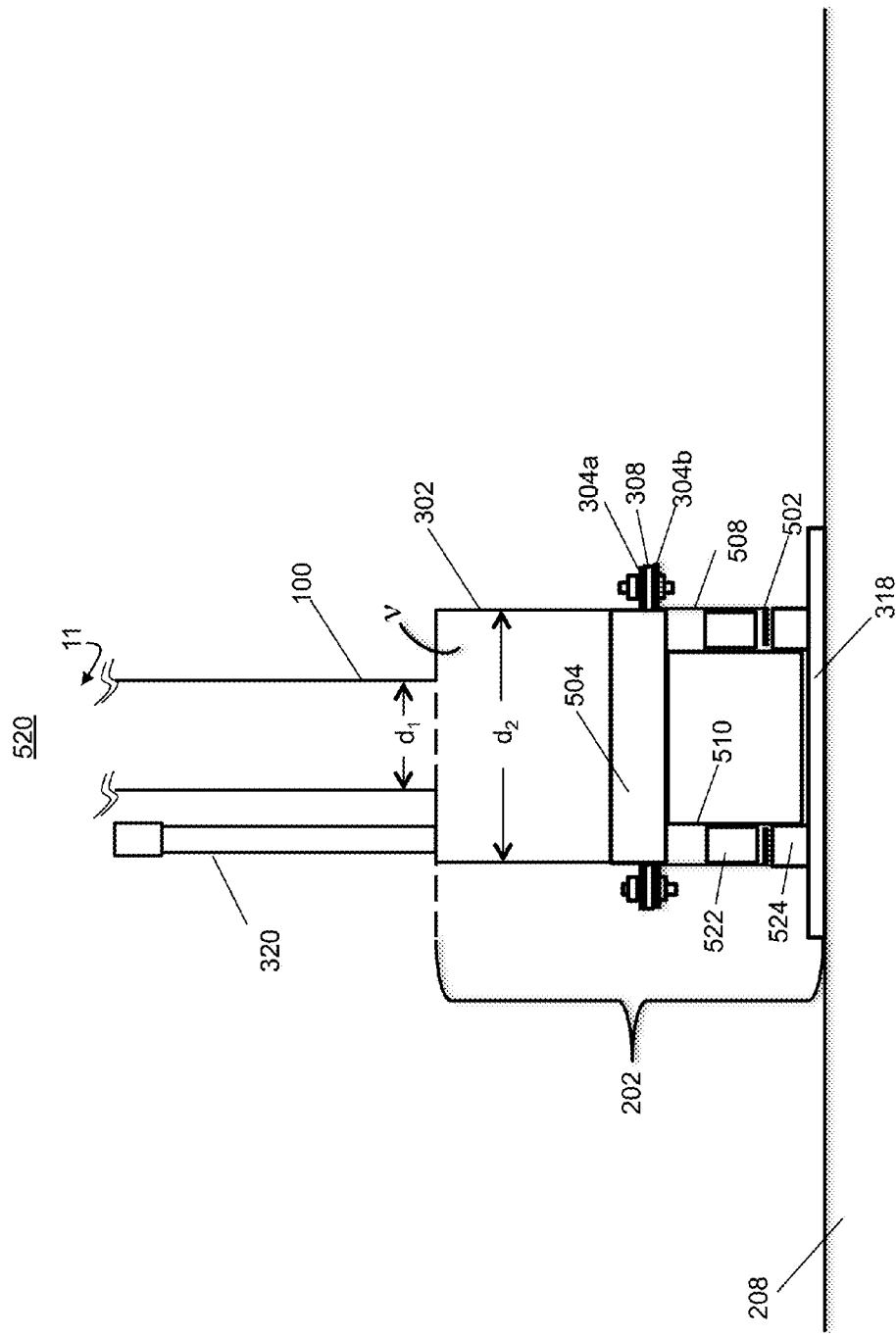
FIG. 5B depicts an exemplary coupling component that includes a coupling chamber, a movement constraining vessel, a stabilizing component, a push plate assembly comprising a top plate, a piston rod, and an earth plate, and a stop component.

FIG. 5B depicts a cross-section of an exemplary system 520 comprising an overpressure wave generator 11 attached to a coupling component 202 that includes a coupling chamber 302, and a push plate assembly comprising a top plate (or piston) 504, a piston rod 510, and an earth plate 318 that is in contact with the target media. The downward movement of the top plate 504 and piston rod 318 are constrained in movement constraining vessel 508. The coupling chamber 302 includes an outer flange 304a. A rubber or comparable sealing component 308 is placed between the outer flange 304a of the coupling chamber 302 and the upper outer flange 304b of the movement constraining vessel 508. The movement constraining vessel has an upper outer flange 304b, a lower inner flange 502, and includes a stabilizing component 522, where the top plate 504 can move downward until it strikes the stabilizing component 522. The stabilizing component is shown being slightly above the lower inner flange 502 (for clarity's sake) but can instead be abutted against the lower inner flange 502. The stabilizing component can be any type of mechanism that constrains movement of the piston rod 510 to only movement that is parallel to the sides of the coupling chamber and movement constraining vessel 508.

A stop component 524, for example a doughnut-shaped rubber stop component, is depicted between the earth plate 318 and the lower inner flange 502 of the movement constraining vessel. Its purpose is to prevent the metal lower inner flange 502 from striking the metal earth plate 318 and thereby prevent the sound of metal striking metal from being produced. Although a rubber stop component 524 is described herein, any other desired material could be used instead of rubber. For clarity's sake, the rubber stop component 524 is depicted being slightly below the lower inner flange 502. However, in normal operation, the lower inner flange 502 could rest upon the rubber stop component 524 prior to detonation such as depicted in FIG. 5C. The thicknesses of the rubber stop 318 and stabilizing component 522 can be selected to limit the movement of the piston rod 510 during a detonation to a desired distance (e.g., three inches). This limiting of movement can be visualized by comparing FIGS. 5C and 5D, which depict the location of the piston rod 510 prior to detonation and immediately after detonation, respectively. As with exemplary system 500, the top plate 504 and earth plate 318 of system 520 may be rigid disks having low mass and strength such as titanium, aluminum, or composite materials such as carbon composite or fiber glass. The piston rod 510 and movement constraining vessel 508 may each be pipes that are also rigid and low mass and may be titanium, aluminum, or composite materials such as carbon composite or fiber glass or high mass substances such as iron or steel.

FIG. 5E depicts a cross section of an exemplary stabilizing component 522. Referring to FIG. 5E stabilizing component 522 comprises four discs 522*a*-522*d*, two O-rings 526*a* 526*b*, a grease spreading component 528*a*, and at least one grease port 530*a*. The stabilizing component 522 could be a circular ring or multiple rings attached together. In FIG. 5E, stabilizing component 522 comprises four circular rings 522*a*-522*d* that are attached by bolts (not shown), which can be loosened to allow the piston rod 510 to be placed into the movement constraining vessel 508, after which the bolts can be tightened causing the O-rings 526*a* 526*b* to press against the piston rod 510. During operation, a grease pump (not shown) can periodically provide grease to the at least one grease port 530*a*, where the grease is spread by the grease spreading component 528*a* during operation of the device. FIG. 5E also depicts O-rings 526*c* 526*d* on the outside of the top plate (or piston) 504, where during operation, grease is periodically provided to at least one grease port 530*b* and the grease is spread by a grease spreading component 528*b*. One skilled in the art will recognize that all sorts of stabilizing approaches can be employed to include having O-rings integrated into the piston rod, use of a bushing, use of a rubber doughnut-shape ring similar to the stop component, and the like. Alternatively, the stabilizing component 522 could be permanently packed with grease.

Figure 6A:
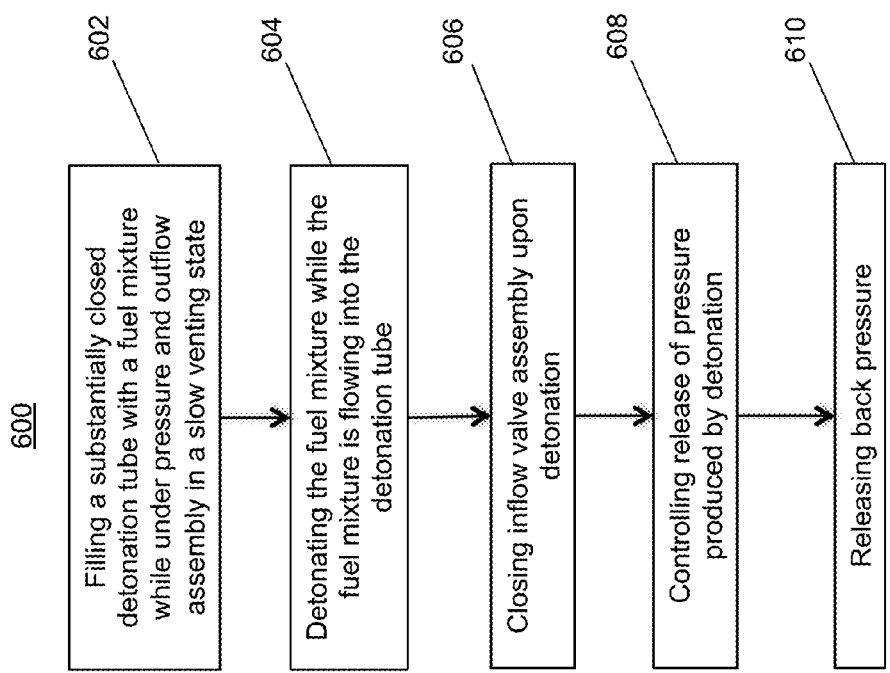
FIG. 6A depicts a first exemplary method for harnessing pressure produced by a detonation.

In accordance with one aspect of the present invention, the release of pressure produced by a detonation within an overpressure wave generator of a seismic exploration system is controlled. FIG. 6A depicts an exemplary method 600 for operating a seismic exploration system in accordance with the present invention that includes the controlled release of pressure. Referring to FIG. 6A, the exemplary method 600 includes a step 602 of filling a detonation tube with a fuel mixture while under pressure and an outflow assembly is in a slow flow state, and a step 604 of detonating the fuel mixture fuel is flowing into the detonation tube. The method also includes a step 606 of closing an inflow valve assembly upon detonation, a step 608 of controlling the release of pressure produced by detonation, and a step 610 of releasing back pressure.

The step 602 of filling a detonation tube with a fuel mixture while under pressure involves allowing air to exit the system on a first detonation (or shot) of a system or allowing exhaust to exit the system on a successive detonation (or shot) of a system, where air or exhaust may be flushed from the system at atmospheric pressure or may be allowed to leak as the system is pressurized.

Step 608 of controlling release of pressure produce by detonation and step 610 of releasing back pressure may involve waiting for pressure to leak out of the system and/or may involve a rapid discharge of pressure from the system.

Figure 6B:
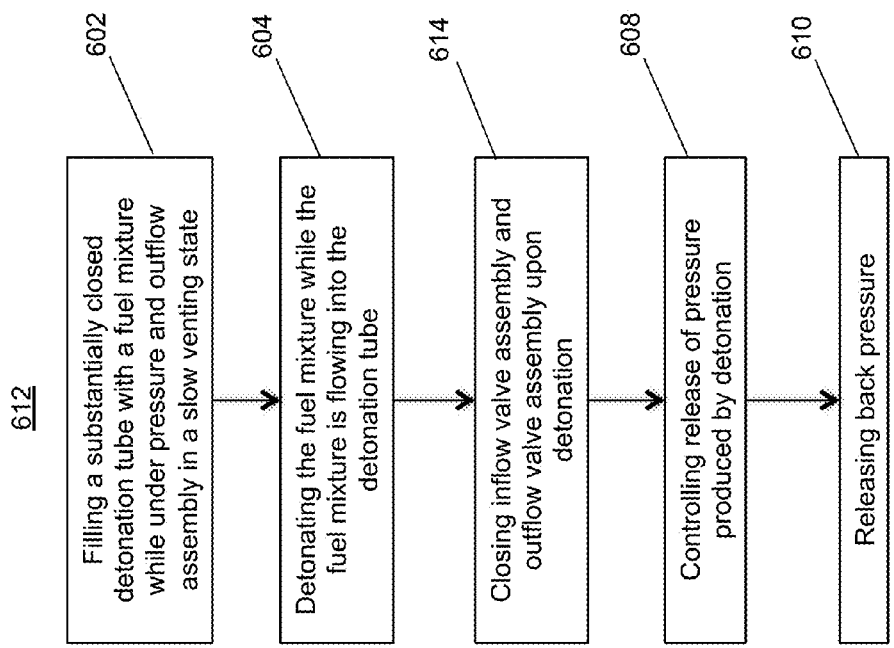
FIG. 6B depicts a second exemplary method for harnessing pressure produced by a detonation.

FIG. 6B depicts another exemplary method 612 for operating a seismic exploration system in accordance with the present invention that is the same as the method 600 of FIG. 6A except after detonating the fuel mixture both the inflow valve assembly and an outflow valve assembly are closed (i.e., step 614 replaces step 606).

Figure 6C:
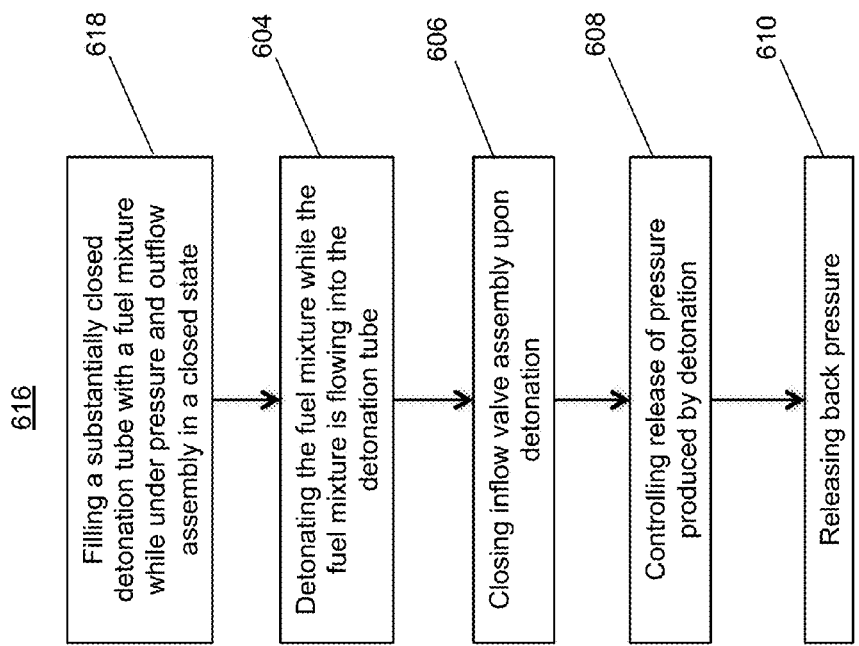
FIG. 6C depicts a third exemplary method for harnessing pressure produced by a detonation.

FIG. 6C depicts another exemplary method 616 for operating a seismic exploration system in accordance with the present invention that is the same as the method 600 of FIG. 6A except the detonation tube is filled with a fuel mixture while under pressure and an outflow assembly is in closed state (i.e., step 616 replaces step 602).

Figure 7A:
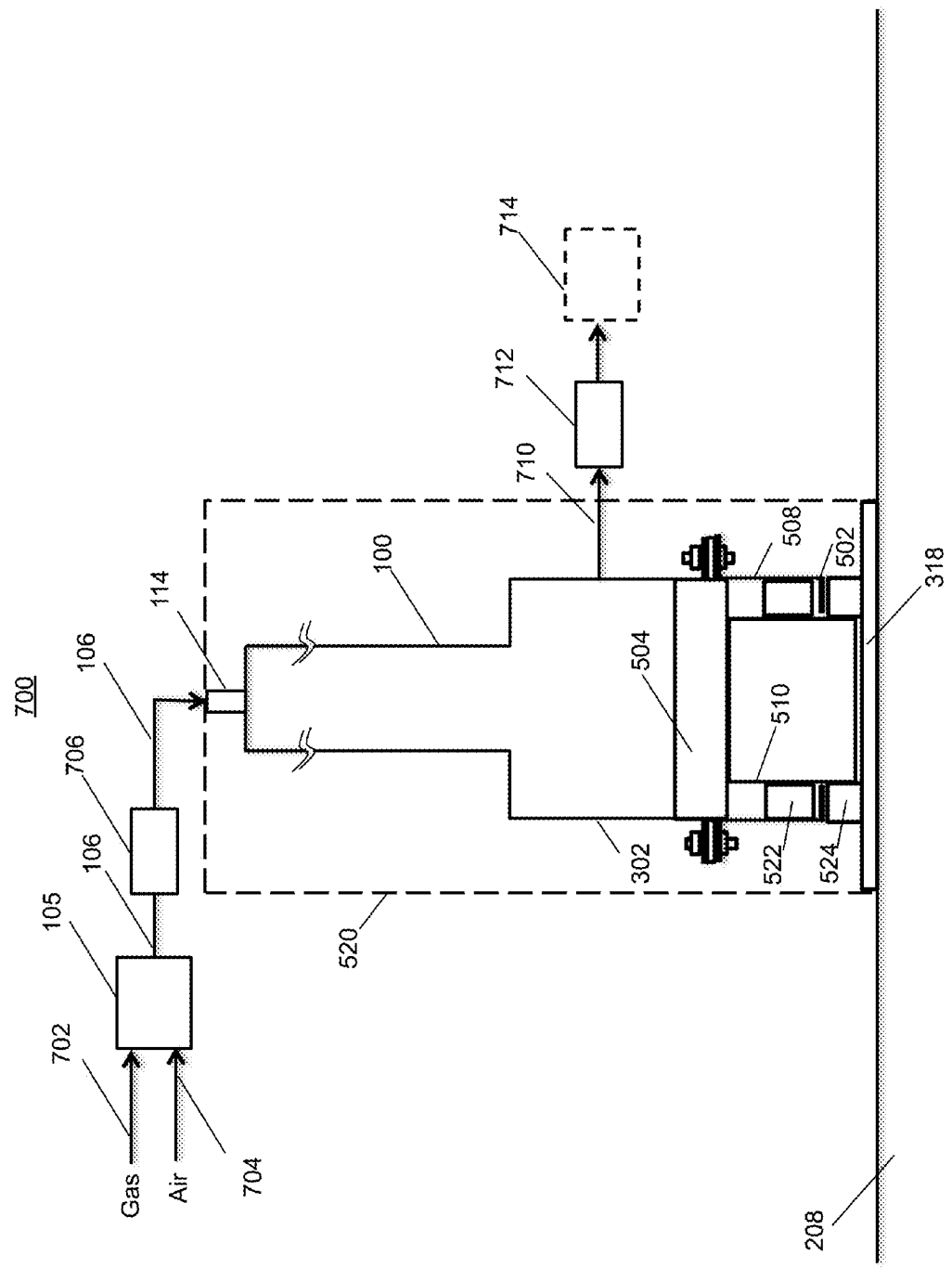
FIG. 7A depicts an exemplary seismic exploration system having an inflow valve assembly and an outflow valve assembly.

FIG. 7A depicts an exemplary seismic exploration system 700 having an inflow valve assembly 706 and an outflow valve assembly 712. Referring to FIG. 7A, gas 702 and air 704 are mixed in a fuel mixture supply 105 and a fuel mixture 106 is provided to an inflow valve assembly that is between the fuel mixture supply 105 and a detonator 114 that receives the fuel mixture 106. The fuel mixture 106 fills the detonation and coupling portion 520 of the system 700 causing air (initial shot) or exhaust (successive shots) 710 to exit into the outflow valve assembly 712 and out of the outflow valve assembly 712 to an optional muffler 714.

Figure 7B:
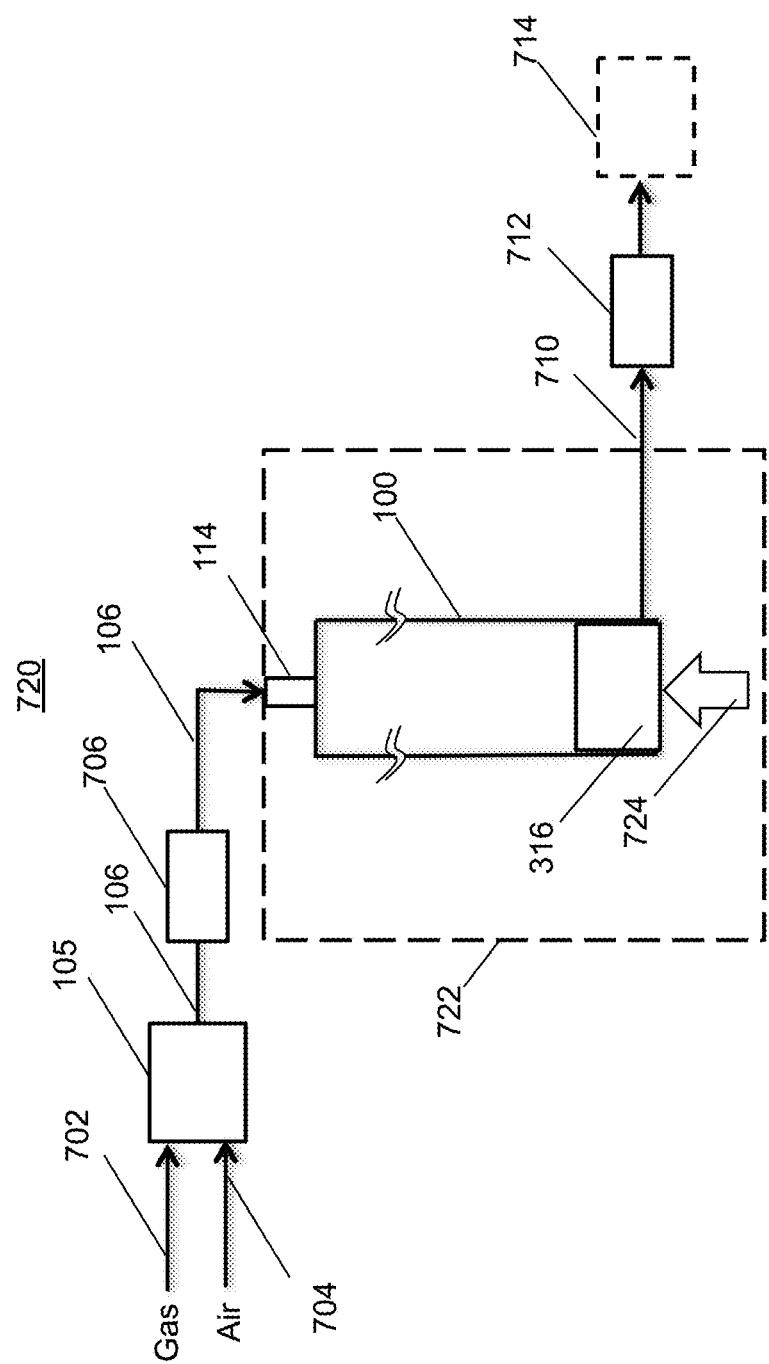
FIG. 7B depicts an exemplary detonation wave pressure harnessing system.

FIG. 7B depict an exemplary detonation wave pressure harnessing system 720. Referring to FIG. 7B, gas 702 and air 704 are mixed in a fuel mixture supply 105 and a fuel mixture 106 is provided to an inflow valve assembly that is between the fuel mixture supply 105 and a detonator 114 that receives the fuel mixture 106. The fuel mixture 106 fills the detonation portion 722 of the system 720 causing air (initial shot) or exhaust (successive shots) 710 to exit into the outflow valve assembly 712 and out of the outflow valve assembly 712 to an optional muffler 714. As shown, the detonation tube 100 of the detonation portion 722 includes a piston 316 that interfaces with a load 724. As such, where the piston 316 of a exemplary seismic exploration system interfaces with a target media such as the ground, ice, or water, the piston 316 of the exemplary detonation wave pressure harnessing system 720 interfaces with a load.

FIG. 8A depicts an exemplary check valve 800 in an open state. Referring to FIG. 8A, the check valve 800, which can be used in the inflow valve assembly 706, includes a first port 802, a second port 804 and a valve opening 806. A valve closing element 808 (i.e., a ball) is connected to a spring 810. When an inflow pressure from a fuel mixture 106 entering the first port 802 meets a minimum threshold pressure at the valve opening 806 the force produced by the spring 810 is overcome caused the check valve 800 to achieve its open state.

FIG. 8B depicts the exemplary check valve 800 of FIG. 8A in a closed state. When a backflow from a detonation enters the second port 804 it causes the check valve 800 to return to a closed state where the backpressure is greater than the inflow pressure and where the check valve 800 will remain in the closed state until the backpressure becomes less than the inflow pressure to the point that the inflow pressure can again overcome the spring 810 and achieve the open state depicted in FIG. 8A. This acts to regulate the fill pressure to the desired PSI.

FIG. 9A depicts a first exemplary excess flow valve 900 in a first closed state. Referring to FIG. 9A, the excess flow valve 900, which can be used in the outflow valve assembly 712, has a first port (or opening) 902 and a second port (or opening) 904 and also includes a valve closing element 808 and a spring 810 where the spring extend through the second port 904. The excess flow valve will remain in its first closed state until the inflow pressure meets a minimum threshold that overcomes the force produced by the spring 810 such that the valve 900 achieves its open state.

FIG. 9B depicts the exemplary excess flow valve of FIG. 9A in an open state where the valve closing element 808 has been moved back away from the first port 902 by the pressure of the air and/or flowing fuel mixture exiting the detonation and coupling portion 520 of the seismic exploration system 700 (or the detonation portion 722 of the detonation wave pressure harnessing system 720).

FIG. 9C depicts the exemplary excess flow valve of FIG. 9A in a second closed state. When a detonation occurs, the detonation causes the pressure exiting the detonation and coupling portion 520 of the seismic exploration system 700 (or the detonation portion 722 of the detonation wave pressure harnessing system 720) to surpass an excess flow threshold causing the valve closing element 808 to close the second port 904 of the excess flow valve 900.

FIG. 9D depicts a second exemplary excess flow valve 906 in a first closed state. Referring to FIG. 9D, the excess flow valve 906, which can be used in the outflow valve assembly 712, has a first port (or opening) 902 and a second port (or opening) 904 at the end of a tube 908 and also includes a valve closing element 808 and a spring 810 where the spring is on the outside of the tube 908. The excess flow valve will remain in its first closed state until the inflow pressure meets a minimum threshold that overcomes the force produced by the spring 810 such that the valve 906 achieves its open state.

FIG. 9E depicts the exemplary excess flow valve of FIG. 9D in an open state where the valve closing element 808 has been moved back away from the first port 902 by the pressure of the air and/or flowing fuel mixture exiting the detonation and coupling portion 520 of the seismic exploration system 700 (or the detonation portion 722 of the detonation wave pressure harnessing system 720).

FIG. 9F depicts the exemplary excess flow valve of FIG. 9D in a second closed state. When the detonation occurs within the system, the detonation causes the pressure exiting the detonation and coupling portion 520 of the seismic exploration system 700 (or the detonation portion 722 of the detonation wave pressure harnessing system 720) to surpass an excess flow threshold causing the valve closing element 808 to close the second port 904 of the excess flow valve 900.

FIG. 10 depicts a constant slow flow rate valve 1000 having a slow (or leak) flow rate represented by the small valve symbol 1002, where the size of the constant slow flow rate valve 1000 can be selected to allow a slow flow rate such that the pressure produced by a detonation will be leaked (or released) over some period of time.

FIG. 11A depicts a slow rate solenoid valve 1100 having a slow flow rate represented by the small valve symbol 1002, where the size of the slow rate solenoid valve 1100 can be selected to allow a slow flow rate for either inflow or outflow purposes. When used in an outflow valve assembly 7006, the pressure produced by a detonation will be slowly leaked (or released) from the system over some period of time to cause the seismic system to slowly change from the state shown in FIG. 5D to the state shown in FIG. 5C. Additionally, the slow rate solenoid valve 1100 includes a solenoid 1104 that can be controlled by a control system 210 to open and close the slow rate solenoid valve 1100 so that it allows a slow flow rate only when it is open.

FIG. 11B depicts a rapid discharge solenoid valve 1106 having a rapid discharge flow rate represented by the large valve symbol 1102, where the size of the rapid discharge solenoid valve 1106 can be selected to allow a rapid discharge flow rate such that the pressure produced by a detonation will be discharged substantially immediately. Additionally, the rapid discharge solenoid valve 1106 includes a solenoid 1104 that can be controlled by a control system 210 to open and close the rapid discharge solenoid valve 1106 so that it allows a rapid discharge flow rate only when it is open.

Figure 12:
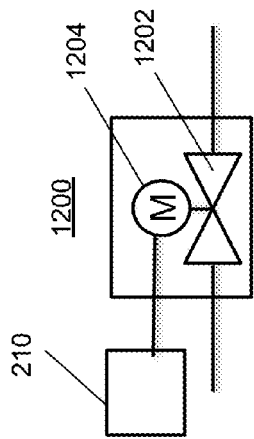
FIG. 12 depicts a variable flow valve.

FIG. 12 depicts a variable flow valve 1200 capable of having a rapid discharge flow rate represented by the large valve symbol 1102, where the size of the variable control valve 1200 can be selected to allow a rapid discharge flow rate such that the pressure produced by a detonation will be discharged substantially immediately. Additionally, the variable flow valve 1200 includes a motor 1204 that can be controlled by a control system 210 to turn the valve 1200 on and off and to control the rate of flow to include limiting the flow through the valve to a slow flow rate. As such, the variable flow valve 1200 is capable of functioning as a valve intended to allow a slow flow rate or a valve intended for a rapid discharge flow rate. Moreover, the variable flow rate 1200 is capable of varying the flow rate over time such that it can increase or lower a flow rate in response to some measured condition or as part of a predefined variable pressure release method.

FIGS. 13A-13H depict exemplary seismic exploration systems 700 having detonation and coupling portions 520, inflow valve assemblies 706, and outflow valve assemblies 712. One skilled in the art will recognize that the detonation and coupling portions 520 could be replaced with detonation portions 722 to practice the invention as exemplary detonation wave pressure harnessing systems 720. As such, FIGS. 13A-13H also depict exemplary detonation wave pressure harnessing systems 720 having detonation portions 722, inflow valve assemblies 706, and outflow valve assemblies 712.

Figure 13A:
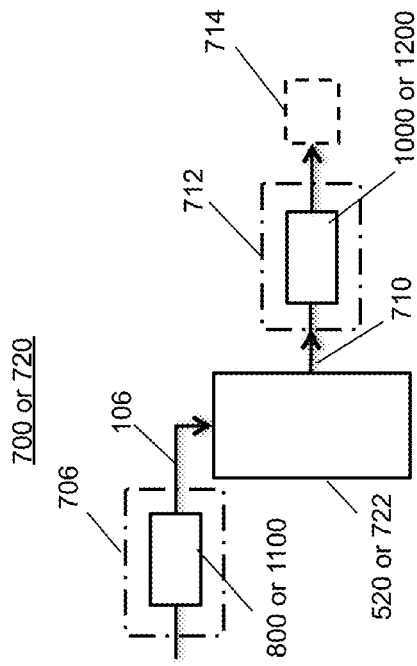
FIG. 13A depicts an exemplary seismic exploration system having a first valve configuration.

FIG. 13A depicts an exemplary seismic exploration system 700 (or exemplary detonation wave pressure harnessing system 720) having a first valve configuration, where the inflow valve assembly 706 includes either a check valve 800 or a slow flow rate solenoid valve 1100 and the outflow valve assembly 712 includes either a constant slow flow rate valve 1000 or a variable flow valve 1200 set to allow a slow flow rate.

Figure 14A:
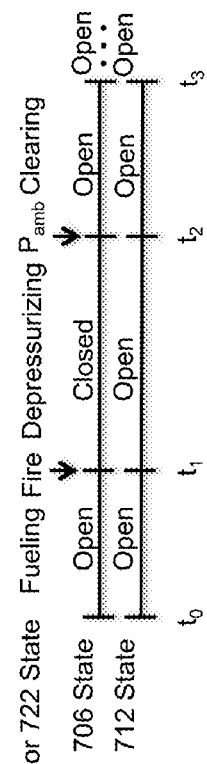
FIG. 14A depicts an exemplary state timeline of the first valve configuration of the seismic exploration system of FIG. 13A.

FIG. 14A depicts an exemplary state timeline of the first valve configuration of the seismic exploration system of FIG. 13A. At time $t_0$, the inflow valve assembly 706 and outflow valve assembly 712 are in an open state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, either the check valve 800 is closed by the pressure of the detonation or the slow flow rate solenoid valve 1100 is closed by the control system 210. The outflow valve assembly 712 remains open after detonation allowing the system to slowly depressurize due to the slow flow rate through the outflow valve assembly 712. After the pressure of the seismic exploration system 700 (or exemplary detonation wave pressure harnessing system 720) substantially reaches ambient pressure, Pamb, at time $t_2$, the inflow valve assembly 706 opens releasing backpressure such that fueling can begin at some time $t_3$, which would correspond to $t_0$ of a successive firing of the seismic exploration system 700 (or the detonation wave pressure harnessing system 720).

Figure 13B:
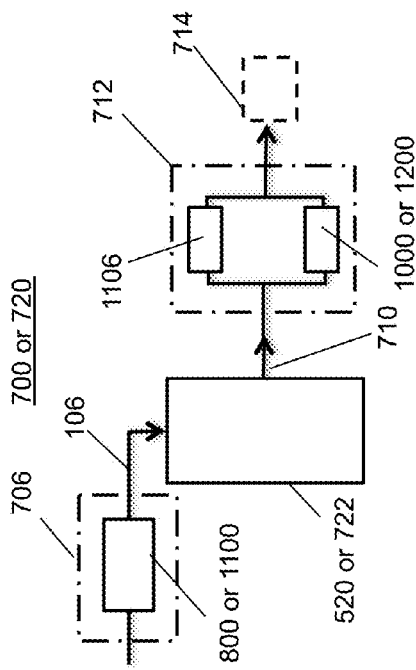
FIG. 13B depicts an exemplary seismic exploration system having a second valve configuration.

FIG. 13B depicts an exemplary seismic exploration system 700 (or exemplary detonation wave pressure harnessing system 720) having a second valve configuration where the inflow valve assembly 706 includes either a check valve 800 or a slow flow rate solenoid valve 1100 and the outflow valve assembly 712 includes a constant slow flow rate valve 1000 in parallel with a rapid discharge flow rate solenoid valve 1106, where a variable flow valve 1200 set to allow a slow flow rate could be used in place of the constant slow flow rate valve 1000.

Figure 14B:
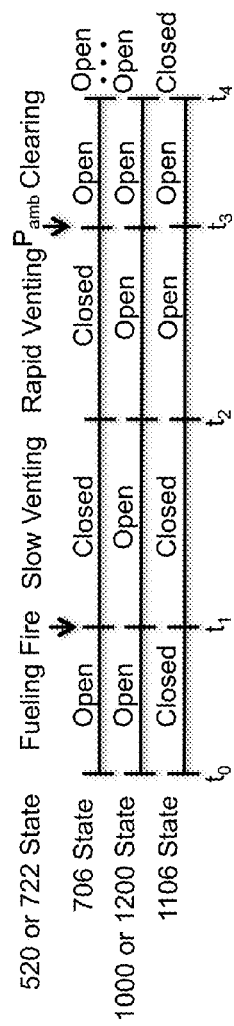
FIG. 14B depicts an exemplary state timeline of the second valve configuration of the seismic exploration system of FIG. 13B.

FIG. 14B depicts an exemplary state timeline of the second valve configuration of the seismic exploration system 700 (or exemplary detonation wave pressure harnessing system 720) of FIG. 13B. At time $t_0$, the inflow valve assembly 706 and the constant slow flow rate valve 1000 (or variable flow valve 1200) of the outflow valve assembly 712 are in an open state and the rapid discharge flow rate solenoid valve 1106 of the outflow valve assembly 712 is in a closed state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, either the check valve 800 is closed by the pressure of the detonation or the slow flow rate solenoid valve 1100 is closed by the control system 210. The constant slow flow rate valve 1000 or the variable flow valve 1200 of the outflow valve assembly 706 remains open after detonation allowing the seismic exploration system 700 (or exemplary detonation wave pressure harnessing system 720) to slowly depressurize or slowly vent due to the slow flow rate through the outflow valve assembly 712. At a time $t_2$, the rapid discharge flow rate solenoid valve 1106 of the outflow valve assembly 712 is opened allowing the remainder of the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure such that fueling can begin at some time $t_4$, which would correspond to $t_0$ of a successive firing of the seismic exploration system 700 (or exemplary detonation wave pressure harnessing system 720). At time $t_4$, the rapid discharge flow rate solenoid valve 1106 of the outflow valve assembly 712 is closed.

Figure 13C:
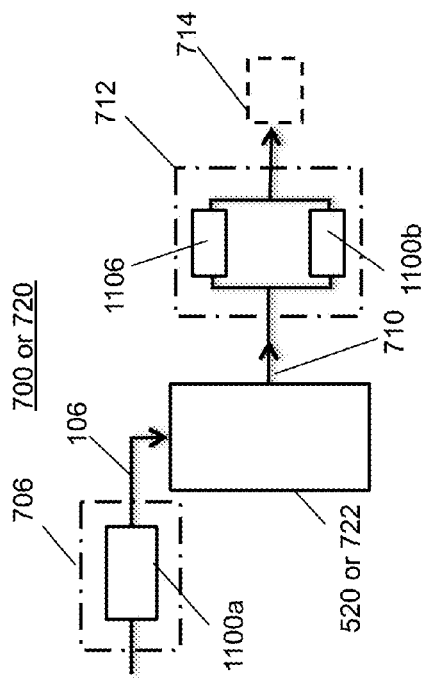
FIG. 13C depicts an exemplary seismic exploration system having a third valve configuration.

FIG. 13C depicts an exemplary seismic exploration system 700 (or exemplary detonation wave pressure harnessing system 720) having a third valve configuration where the inflow valve assembly 706 includes a first slow flow rate solenoid valve 1100a and the outflow valve assembly 712 includes a second slow flow rate solenoid valve 1100b in parallel with a rapid discharge flow rate solenoid flow valve 1106.

Figure 14C:
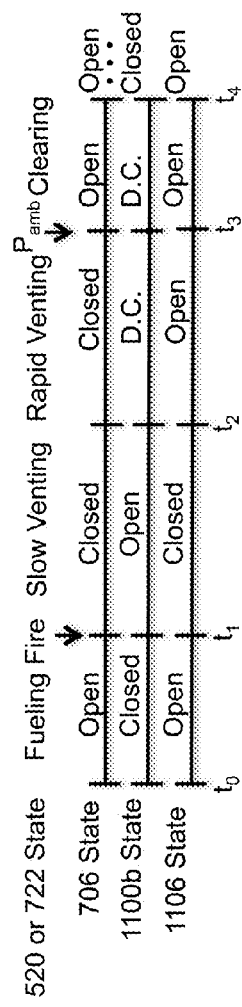
FIG. 14C depicts an exemplary state timeline of the third valve configuration of the seismic exploration system of FIG. 13C.

FIG. 14C depicts an exemplary state timeline of the third valve configuration of the seismic exploration system 700 (or exemplary detonation wave pressure harnessing system 720) of FIG. 13C. At time $t_0$, the first slow flow rate solenoid valve 1100a of the inflow valve assembly 706 and the rapid discharge flow rate solenoid valve 1106 of the outflow valve assembly 712 are in an open state and the second solenoid valve 1100b of the outflow valve assembly 712 is in a closed state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, the first slow flow rate solenoid valve 1100a and the rapid discharge flow rate solenoid valve 1106 are closed by the control system 210 and the second slow flow rate solenoid valve 1100b is opened allowing the seismic exploration system 700 (or exemplary detonation wave pressure harnessing system 720) to slowly depressurize or slowly vent due to the slow flow rate through the outflow valve assembly 712. The opening of the second slow flow rate solenoid valve 1100b can occur substantially immediately upon firing or at some other time prior to $t_2$. At a time $t_2$, the rapid discharge flow rate solenoid valve 1106 of the outflow valve assembly 712 is opened allowing the remainder of the exhaust to rapidly vent the seismic exploration system 700 (or exemplary detonation wave pressure harnessing system 720), where the state of the second slow flow rate solenoid valve 1100b can be open or closed (i.e., a don't care or D.C. state). After the pressure of the system substantially reaches ambient pressure, Pamb, at time $t_3$, the inflow valve assembly 706 opens releasing backpressure such that fueling can begin at some time $t_4$, which would correspond to $t_0$ of a successive firing of the seismic exploration system 700 (or exemplary detonation wave pressure harnessing system 720), where at $t_0$ the second slow flow rate solenoid valve is closed and the rapid discharge flow rate solenoid valve is open.

Figure 13D:
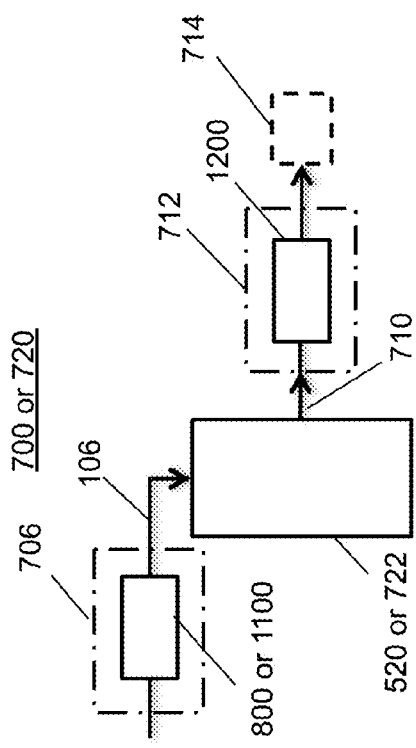
FIG. 13D depicts an exemplary seismic exploration system having a fourth valve configuration.

FIG. 13D depicts an exemplary seismic exploration system 700 (or exemplary detonation wave pressure harnessing system 720) having a fourth valve configuration where the inflow valve assembly 706 includes a check valve 800 or a slow flow rate solenoid valve 1100 and the outflow valve assembly 712 includes a variable flow valve 1200.

Figure 14D:
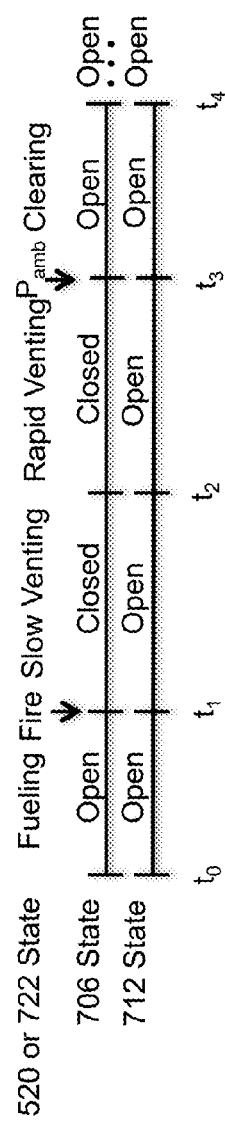
FIG. 14D depicts an exemplary state timeline of the fourth valve configuration of the seismic exploration system of FIG. 13D.

FIG. 14D depicts an exemplary state timeline of the fourth valve configuration of the seismic exploration system 700 (or exemplary detonation wave pressure harnessing system 720) of FIG. 13D. At time $t_0$, the inflow valve assembly 706 and the outflow valve assembly 712 are in an open state as a fuel mixture begins filling the seismic exploration system 700 (or exemplary detonation wave pressure harnessing system 720), where the variable flow rate valve 1200 is set to a slow flow rate. While fuel continues to flow into the seismic exploration system 700 (or exemplary detonation wave pressure harnessing system 720), at time $t_1$ the fuel is ignited causing a detonation. Upon detonation, the inflow valve assembly 706 is closed allowing the seismic exploration system 700 (or exemplary detonation wave pressure harnessing system 720) to slowly depressurize or slowly vent due to the slow flow rate through the outflow valve assembly 712. At a time $t_2$, the variable flow rate valve 1200 is set to a rapid discharge flow rate allowing the remainder of the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure such that fueling can begin at some time $t_1$, which would correspond to $t_0$ of a successive firing of the seismic exploration system 700 (or exemplary detonation wave pressure harnessing system 720).

Figure 13E:
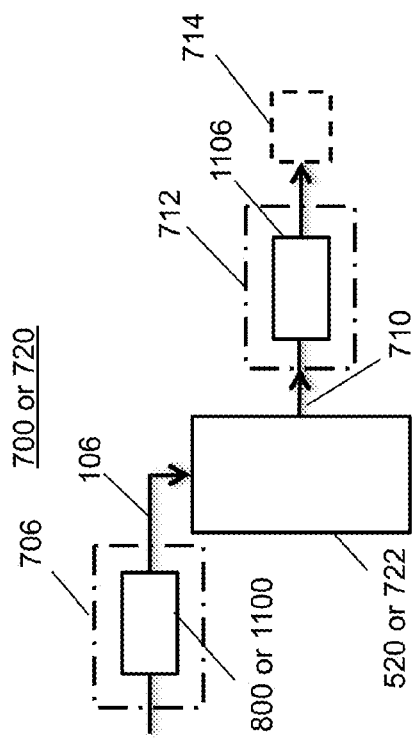
FIG. 13E depicts an exemplary seismic exploration system having a fifth valve configuration.

FIG. 13E depicts an exemplary seismic exploration system 700 (or exemplary detonation wave pressure harnessing system 720) having a fifth valve configuration where the inflow valve assembly 706 includes a check valve 800 or a slow flow rate solenoid valve 1100 and the outflow valve assembly 712 includes a rapid discharge flow rate solenoid valve 1106.

Figure 14E:
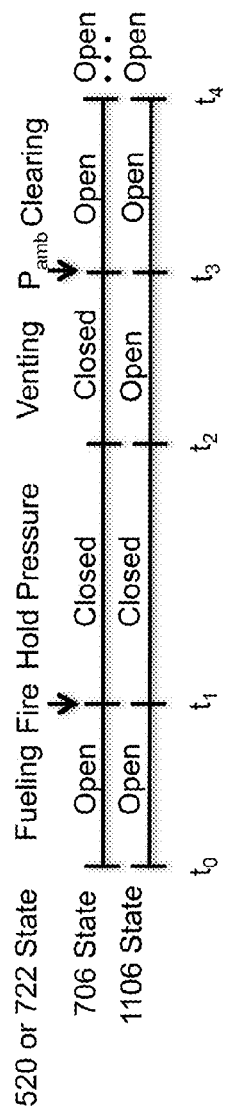
FIG. 14E depicts an exemplary state timeline of the fifth valve configuration of the seismic exploration system of FIG. 13E.

FIG. 14E depicts an exemplary state timeline of the fifth valve configuration of the seismic exploration system 700 (or exemplary detonation wave pressure harnessing system 720) of FIG. 13E. At time $t_0$, the inflow valve assembly 706 and the outflow valve assembly 712 are in an open state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, the inflow valve assembly 706 and the outflow valve assembly 712 are closed thereby holding the pressure within the seismic exploration system 700 (or exemplary detonation wave pressure harnessing system 720). At a time $t_2$, the rapid discharge flow rate solenoid valve 1106 is opened allowing the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure such that fueling can begin at some time $t_4$, which would correspond to $t_0$ of a successive firing of the seismic exploration system 700 (or exemplary detonation wave pressure harnessing system 720).

Figure 13F:
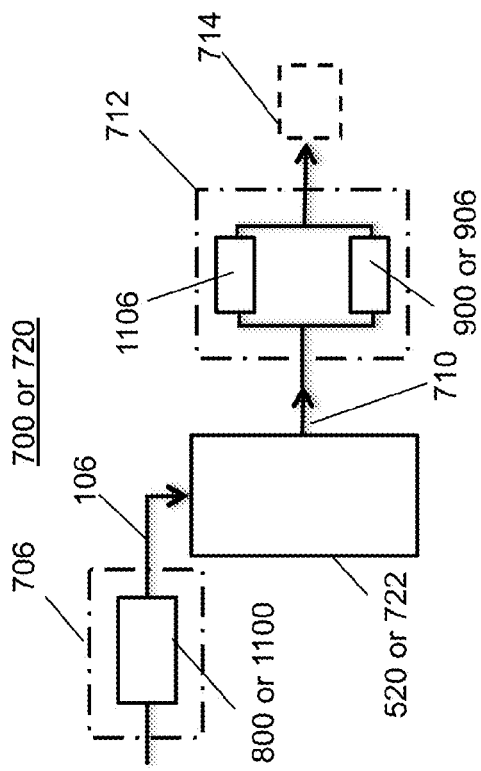
FIG. 13F depicts an exemplary seismic exploration system having a sixth valve configuration.

FIG. 13F depicts an exemplary seismic exploration system 700 (or exemplary detonation wave pressure harnessing system 720) having a sixth valve configuration where the inflow valve assembly 706 includes a check valve 800 or a slow flow rate solenoid valve 1100 and the outflow valve assembly 712 includes an excess flow valve 900 or 906 in parallel with a rapid discharge flow rate solenoid valve 1106.

Figure 14F:
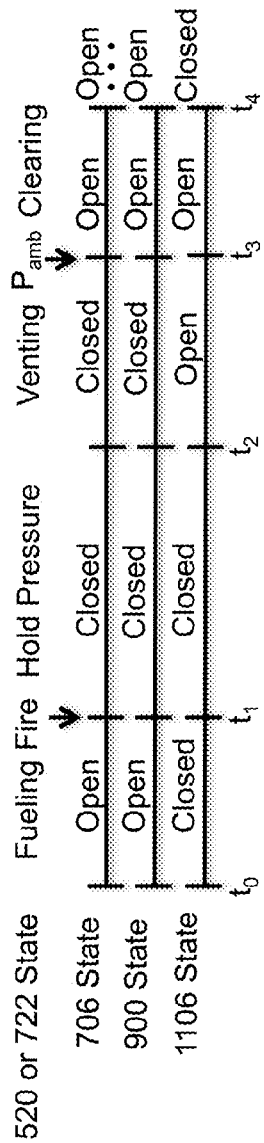
FIG. 14F depicts an exemplary state timeline of the sixth valve configuration of the seismic exploration system of FIG. 13F.

FIG. 14F depicts an exemplary state timeline of the sixth valve configuration of the seismic exploration system 700 (or exemplary detonation wave pressure harnessing system 720) of FIG. 13F. At time $t_0$, the inflow valve assembly 706 and the excess flow valve 900 or 906 of the outflow valve assembly 712 are in an open state and the rapid discharge flow rate solenoid valve 1106 of the outflow valve assembly 712 are in a closed state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, the inflow valve assembly 706 and the excess flow valve of the outflow valve assembly 712 are closed thereby holding the pressure within the seismic exploration system 700 (or exemplary detonation wave pressure harnessing system 720). At a time $t_2$, the rapid discharge flow rate solenoid valve 1106 is opened allowing the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure and the excess flow valve 900 or 906 opens such that fueling can begin at some time $t_4$, which would correspond to $t_0$ of a successive firing of the seismic exploration system 700 (or exemplary detonation wave pressure harnessing system 720). At time $t_4$, the rapid discharge flow rate solenoid valve 1106 of the outflow valve assembly 712 is closed.

Figure 13G:
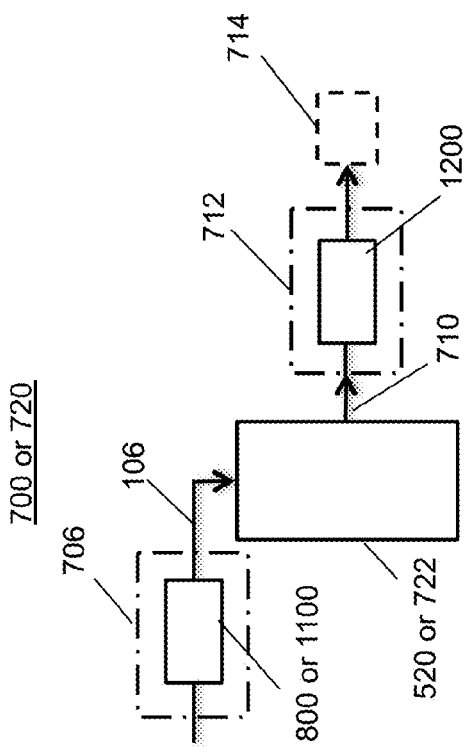
FIG. 13G depicts an exemplary seismic exploration system having a seventh valve configuration.

FIG. 13G depicts an exemplary seismic exploration system 700 (or exemplary detonation wave pressure harnessing system 720) having a seventh valve configuration, where the inflow valve assembly 706 includes either a check valve 800 or a slow flow rate solenoid valve 1100 and the outflow valve assembly 712 includes a variable flow valve 1200.

Figure 14G:
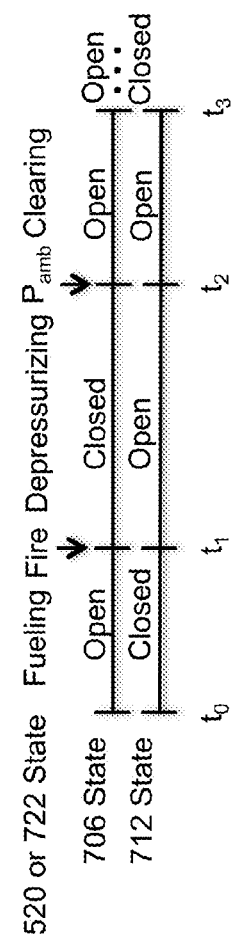
FIG. 14G depicts an exemplary state timeline of the seventh valve configuration of the seismic exploration system of FIG. 13G.

FIG. 14G depicts an exemplary state timeline of the seventh valve configuration of the seismic exploration system 700 (or exemplary detonation wave pressure harnessing system 720) of FIG. 13G. At time $t_0$, the inflow valve assembly 706 is in an open state and the variable flow valve 1200 and the rapid discharge flow rate solenoid valve 1106 of the outflow valve assembly 712 are in a closed state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, either the check valve 800 is closed by the pressure of the detonation or the slow flow rate solenoid valve 1100 is closed by the control system 210. The variable flow valve 1200 of the outflow valve assembly 706 is opened to allow a slow flow rate after detonation thereby allowing the seismic exploration system 700 (or exemplary detonation wave pressure harnessing system 720) to slowly depressurize or slowly vent due to the slow flow rate through the outflow valve assembly 712. The opening of the variable flow valve 1200 can occur substantially immediately upon firing or at some other time prior to $t_2$. At a time $t_2$, the rapid discharge flow rate solenoid valve 1106 of the outflow valve assembly 712 is opened allowing the remainder of the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure such that fueling can begin at some time $t_1$, which would correspond to $t_0$ of a successive firing of the seismic exploration system 700 (or exemplary detonation wave pressure harnessing system 720). At time $t_4$, the variable flow valve 1200 and the rapid discharge flow rate solenoid valve 1106 of the outflow valve assembly 712 are closed.

Figure 13H:
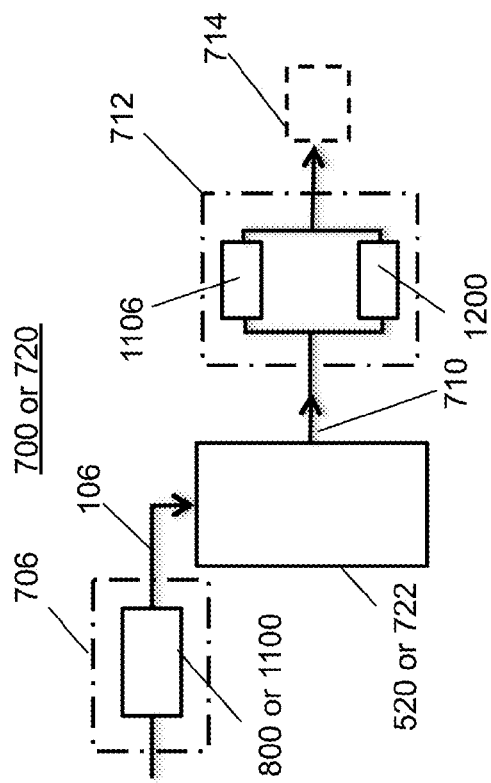
FIG. 13H depicts an exemplary seismic exploration system having a eighth valve configuration.

FIG. 13H depicts an exemplary seismic exploration system 700 (or exemplary detonation wave pressure harnessing system 720) having an eighth valve configuration where the inflow valve assembly 706 includes either a check valve 800 or a slow flow rate solenoid valve 1100 and the outflow valve assembly 712 includes a variable flow valve 1200 in parallel with a rapid discharge flow rate solenoid valve 1106.

Figure 14H:
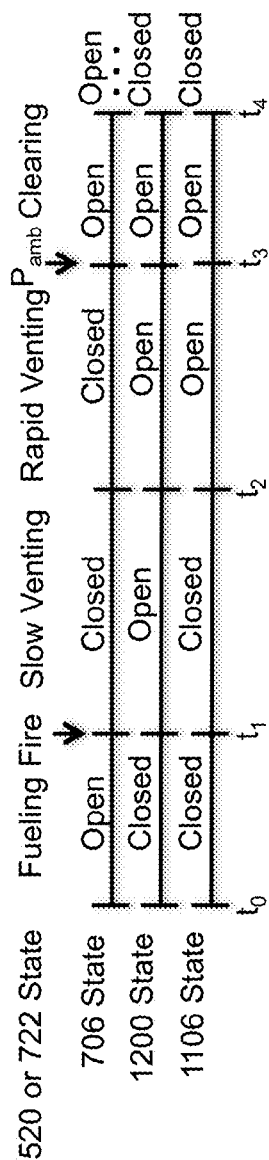
FIG. 14H depicts an exemplary state timeline of the eighth valve configuration of the seismic exploration system of FIG. 13H.

FIG. 14H depicts an exemplary state timeline of the eighth valve configuration of the seismic exploration system 700 (or exemplary detonation wave pressure harnessing system 720) of FIG. 13H. At time $t_0$, the inflow valve assembly 706 is in an open state and the variable flow valve 1200 and the rapid discharge flow rate solenoid valve 1106 of the outflow valve assembly 712 are in a closed state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, either the check valve 800 is closed by the pressure of the detonation or the slow flow rate solenoid valve 1100 is closed by the control system 210. The variable flow valve 1200 of the outflow valve assembly 706 are opened after detonation allowing the seismic exploration system 700 (or exemplary detonation wave pressure harnessing system 720) to slowly depressurize or slowly vent due to the slow flow rate through the outflow valve assembly 712. The opening of the variable flow valve 1200 can occur substantially immediately upon firing or at some other time prior to $t_2$. At a time $t_2$, the rapid discharge flow rate solenoid valve 1106 of the outflow valve assembly 712 is opened allowing the remainder of the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure such that fueling can begin at some time $t_4$, which would correspond to $t_0$ of a successive firing of the seismic exploration system 700 (or exemplary detonation wave pressure harnessing system 720). At time $t_4$, the variable flow valve 1200 and the rapid discharge flow rate solenoid valve 1106 of the outflow valve assembly 712 are closed.

Figure 14I:
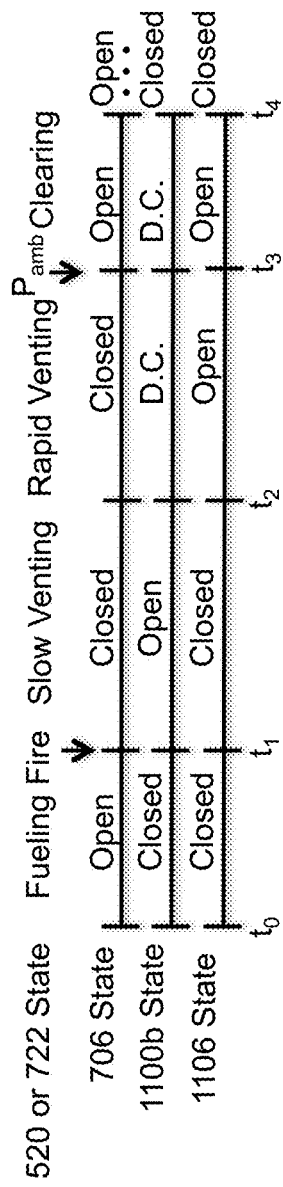
FIG. 14I depicts a second exemplary state timeline of the third valve configuration of the seismic exploration system of FIG. 13C.

FIG. 14I depicts a second exemplary state timeline of the third valve configuration of the seismic exploration system 700 (or exemplary detonation wave pressure harnessing system 720) of FIG. 13C. At time $t_0$, the first slow flow rate solenoid valve 1100a of the inflow valve assembly 706 is in an open state and the rapid discharge flow rate solenoid valve 1106 and the second solenoid valve 1100b of the outflow valve assembly 712 are in a closed state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, the first slow flow rate solenoid valve 1100a is closed by the control system 210 and the second slow flow rate solenoid valve 1100b is opened allowing the seismic exploration system 700 (or exemplary detonation wave pressure harnessing system 720) to slowly depressurize or slowly vent due to the slow flow rate through the outflow valve assembly 712. The opening of the second slow flow rate solenoid valve 1100b can occur substantially immediately upon firing or at some other time prior to $t_2$. At a time $t_2$, the rapid discharge flow rate solenoid valve 1106 of the outflow valve assembly 712 is opened allowing the remainder of the exhaust to rapidly vent the seismic exploration system 700 (or exemplary detonation wave pressure harnessing system 720), where the state of the second slow flow rate solenoid valve 1100b can be open or closed (i.e., a don't care or D.C. state). After the pressure of the system substantially reaches ambient pressure, Pamb, at time $t_3$, the inflow valve assembly 706 opens releasing backpressure such that fueling can begin at some time $t_4$, which would correspond to $t_0$ of a successive firing of the seismic exploration system 700 (or exemplary detonation wave pressure harnessing system 720), where at $t_0$ the second slow flow rate solenoid valve is closed and the rapid discharge flow rate solenoid valve is open. At time $t_4$, the second slow flow rate solenoid valve 1100b and the rapid discharge flow rate solenoid valve 1106 of the outflow valve assembly 712 are closed.

Figure 14J:
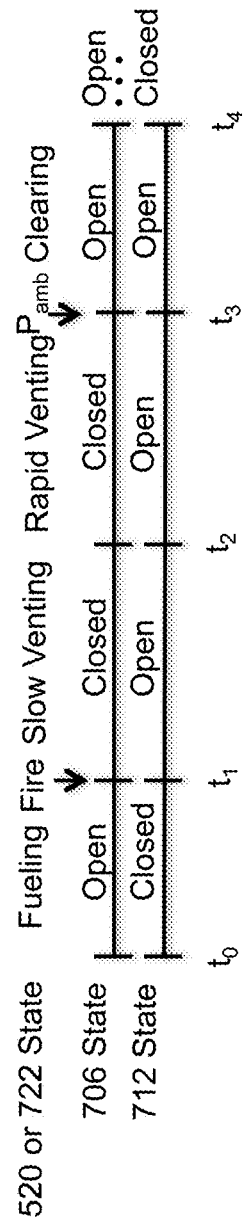
FIG. 14J depicts a second exemplary state timeline of the fourth valve configuration of the seismic exploration system of FIG. 13D.

FIG. 14J depicts a second exemplary state timeline of the fourth valve configuration of the seismic exploration system 700 (or exemplary detonation wave pressure harnessing system 720) of FIG. 13D. At time $t_0$, the inflow valve assembly 706 is in an open state and the outflow valve assembly 712 is in a closed state as a fuel mixture begins filling the seismic exploration system 700 (or exemplary detonation wave pressure harnessing system 720. While fuel continues to flow into the seismic exploration system 700 (or exemplary detonation wave pressure harnessing system 720), at time $t_1$ the fuel is ignited causing a detonation. Upon detonation, the inflow valve assembly 706 is closed and the outflow valve assembly 712 is opened allowing the seismic exploration system 700 (or exemplary detonation wave pressure harnessing system 720) to depressurize or vent due at a desired rate through the outflow valve assembly 712, where slow venting is not necessarily required prior to rapid venting or where the venting rate can vary over time. The opening of the outflow valve assembly 712 can occur substantially immediately upon firing or at some other time prior to or at $t_2$. At a time $t_2$, the variable flow rate valve 1200 is set to a rapid discharge flow rate allowing the remainder of the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure such that fueling can begin at some time $t_4$, which would correspond to $t_0$ of a successive firing of the seismic exploration system 700 (or exemplary detonation wave pressure harnessing system 720). At time $t_4$, the outflow valve assembly 712 is closed.

Figure 14K:
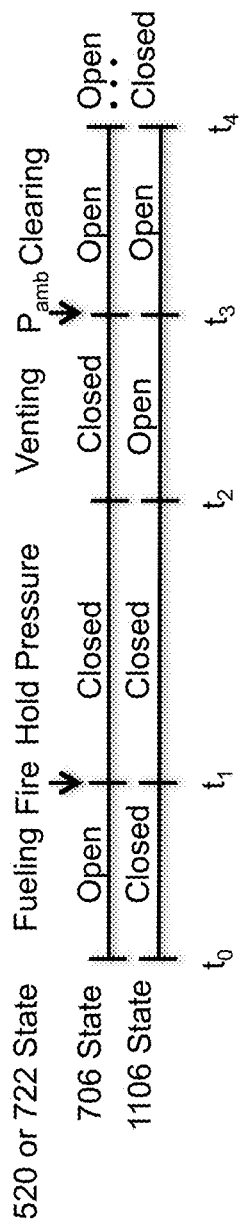
FIG. 14K depicts a second exemplary state timeline of the fifth valve configuration of the seismic exploration system of FIG. 13E.

FIG. 14K depicts a second exemplary state timeline of the fifth valve configuration of the seismic exploration system 700 (or exemplary detonation wave pressure harnessing system 720) of FIG. 13E. At time $t_0$, the inflow valve assembly 706 is in an open state and the outflow valve assembly 712 is in a closed state as a fuel mixture begins filling the seismic exploration system 700 (or exemplary detonation wave pressure harnessing system 720). While fuel continues to flow into the seismic exploration system 700 (or exemplary detonation wave pressure harnessing system 720), at time $t_1$ the fuel is ignited causing a detonation. Upon detonation, the inflow valve assembly 706 is closed thereby holding the pressure within the seismic exploration system 700 (or exemplary detonation wave pressure harnessing system 720). At a time $t_2$, the rapid discharge flow rate solenoid valve 1106 is opened allowing the exhaust to rapidly vent the seismic exploration system 700 (or exemplary detonation wave pressure harnessing system 720). After the pressure of the seismic exploration system 700 (or exemplary detonation wave pressure harnessing system 720) substantially reaches ambient pressure, Pamb, at time $t_3$, the inflow valve assembly 706 opens releasing backpressure such that fueling can begin at some time $t_4$, which would correspond to $t_0$ of a successive firing of the seismic exploration system 700 (or exemplary detonation wave pressure harnessing system 720). At time $t_4$, the outflow valve assembly 712 is closed.

In accordance with an optional aspect of the invention, a flow constricting device is provided to constrict (or restrict) the flow of the outflow valve assembly 712.

In accordance with another aspect of the present invention, the systems and methods described herein for harnessing pressure produced by a detonation can be used with DDT technology instead of direct detonation technology.

In accordance with still another aspect of the present invention, a spring 808 can be replaced by a pair of magnetic structures.

In accordance with a further aspect of the present invention, the various parameters of the system that control the timing and amplitude of the detonation and the flow rates of the various valves of the system are calibrated to meet specific environmental and application specific requirements.

While particular embodiments of the invention have been described, it will be understood, however, that the invention is not limited thereto, since modifications may be made by those skilled in the art, particularly in light of the foregoing teachings.

The invention claimed is:

1. A detonation wave pressure harnessing system, comprising:
   a detonation tube configured to generate a detonation wave;
   a coupling chamber, said coupling chamber being substantially sealed when said detonation wave is generated thereby containing a pressure produced by said detonation wave;
   an interface between said coupling chamber and a target, said interface converting said pressure into a force that is applied to said target;
   an inflow valve assembly;
   an outflow valve assembly configured to release said pressure over a period of time; and
   a control system configured to control said period of time of said release of said pressure by said outflow valve assembly.

2. The system of claim 1, wherein said inflow valve assembly comprises a check valve.

3. The system of claim 2, wherein said outflow valve assembly comprises a constant slow flow rate valve.

4. The system of claim 2, wherein said outflow valve assembly comprises a variable flow valve.

5. The system of claim 2, wherein said outflow valve assembly comprises a rapid discharge flow valve.

6. The system of claim 5, wherein said outflow valve assembly comprises a constant slow flow rate valve.

7. The system of claim 5, wherein said outflow valve assembly comprises a variable flow valve.

8. The system of claim 5, wherein said outflow valve assembly comprises an excess flow valve.

9. The system of claim 8, said excess flow valve comprises:
   a first port;
   a second port;
   a valve closing element; and
   a spring, said spring extending through said second port.

10. The system of claim 8, said excess flow valve comprises:
    a first port;
    a second port at the end of a tube;
    a valve closing element; and
    a spring, said spring being on the outside of said tube.

11. The system of claim 1, wherein said inflow valve assembly comprises a slow rate solenoid valve.

12. The system of claim 11, wherein said outflow valve assembly comprises a constant slow flow rate valve.

13. The system of claim 11, wherein said outflow valve assembly comprises a variable flow valve.

14. The system of claim 11, wherein said outflow valve assembly comprises a rapid discharge flow valve.

15. The system of claim 14, wherein said outflow valve assembly comprises a constant slow flow rate valve.

16. The system of claim 14, wherein said outflow valve assembly comprises a variable flow valve.

17. The system of claim 14, wherein said outflow valve assembly comprises another slow rate solenoid valve.

18. The system of claim 14, wherein said outflow valve assembly comprises an excess flow valve.

19. The system of claim 18, wherein said excess flow valve comprises:
    a first port;
    a second port;
    a valve closing element; and
    a spring, said spring extending through said second port.

20. The system of claim 18, wherein said excess flow valve comprises:
    a first port;
    a second port at the end of a tube;
    a valve closing element; and
    a spring, said spring being on the outside of said tube.

* * * * *